(12) United States Patent
Tarama et al.

(10) Patent No.: US 9,126,109 B2
(45) Date of Patent: Sep. 8, 2015

(54) GAME DEVICE, CONTROL METHOD OF GAME DEVICE, PROGRAM, AND INFORMATION STORAGE MEDIUM

(75) Inventors: Naoki Tarama, Osaka (JP); Yuji Nakamura, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 14/344,914

(22) PCT Filed: Aug. 6, 2012

(86) PCT No.: PCT/JP2012/070023
§ 371 (c)(1),
(2), (4) Date: Mar. 14, 2014

(87) PCT Pub. No.: WO2013/038844
PCT Pub. Date: Mar. 21, 2013

(65) Prior Publication Data
US 2014/0349760 A1    Nov. 27, 2014

(30) Foreign Application Priority Data

Sep. 14, 2011  (JP) ................................. 2011-200725
Jul. 31, 2012  (JP) ................................. 2012-169665

(51) Int. Cl.
*A63F 9/24* (2006.01)
*A63F 13/98* (2014.01)
*A63F 13/40* (2014.01)

(52) U.S. Cl.
CPC ................. *A63F 13/02* (2013.01); *A63F 13/10* (2013.01); *A63F 2300/1087* (2013.01); *A63F 2300/305* (2013.01); *A63F 2300/61* (2013.01); *A63F 2300/638* (2013.01); *A63F 2300/8047* (2013.01)

(58) Field of Classification Search
CPC .................................. A63F 13/06; A63F 13/10
USPC ............................................................ 463/42
See application file for complete search history.

(56) References Cited

U.S. PATENT DOCUMENTS 8,702,509 B2    4/2014  Yamamoto
2002/0002411 A1  1/2002  Higurashi et al.

FOREIGN PATENT DOCUMENTS

EP    0972550 A2    1/2000
JP    2000-218046 A   8/2000

(Continued)

OTHER PUBLICATIONS

English Translation of Written Opinion of the International Searching Authority for PCT/JP2012/070023 accompanied with PCT/IB/373 and PCT/IB/338 dated Mar. 27, 2014, acting as concise explanation of previously submitted reference(s).

(Continued)

*Primary Examiner* — Omkar Deodhar
(74) *Attorney, Agent, or Firm* — Hubbs, Enatsky & Inoue PLLC

(57) ABSTRACT

A guide unit of a game device moves a guide image from a generation position to a return position and thereafter moves the game image from the return position toward the generation position in a game screen, based on reference timing data indicating a reference timing at which a player should perform a game operation, to thereby indicate the reference timing to the player. A game operation detection unit detects a game operation by a player. An evaluation unit evaluates a game operation by a player, based on an operation timing at which a player performs a game operation and a reference timing indicated by the reference timing data.

15 Claims, 23 Drawing Sheets

(56) References Cited

FOREIGN PATENT DOCUMENTS

| JP | 2001-070639 A | 3/2001 |
| JP | 2001-162044 A | 6/2001 |
| JP | 2003-205174 A | 7/2003 |
| JP | 2007-097861 A | 4/2007 |
| JP | 2011-189011 A | 9/2011 |

OTHER PUBLICATIONS

Partial translation of an Office Action for Corres. App. JP2012-169665 dated Oct. 30, 2012.
International Search Report for PCT/JP2012/070023 dated Oct. 30, 2012.

FIG.5

| PART | 3D COORDINATE |
|---|---|
| HEAD | P1($X_{P1}$, $Y_{P1}$, $Z_{P1}$) |
| NECK | P2($X_{P2}$, $Y_{P2}$, $Z_{P2}$) |
| UPPER LEFT ARM | P3($X_{P3}$, $Y_{P3}$, $Z_{P3}$) |
| UPPER RIGHT ARM | P4($X_{P4}$, $Y_{P4}$, $Z_{P4}$) |
| LOWER LEFT ARM | P5($X_{P5}$, $Y_{P5}$, $Z_{P5}$) |
| LOWER RIGHT ARM | P6($X_{P6}$, $Y_{P6}$, $Z_{P6}$) |
| BACK | P7($X_{P7}$, $Y_{P7}$, $Z_{P7}$) |
| LEFT THIGH | P8($X_{P8}$, $Y_{P8}$, $Z_{P8}$) |
| RIGHT THIGH | P9($X_{P9}$, $Y_{P9}$, $Z_{P9}$) |
| LEFT SHIN | P10($X_{P10}$, $Y_{P10}$, $Z_{P10}$) |
| RIGHT SHIN | P11($X_{P11}$, $Y_{P11}$, $Z_{P11}$) |
| ⋮ | ⋮ |

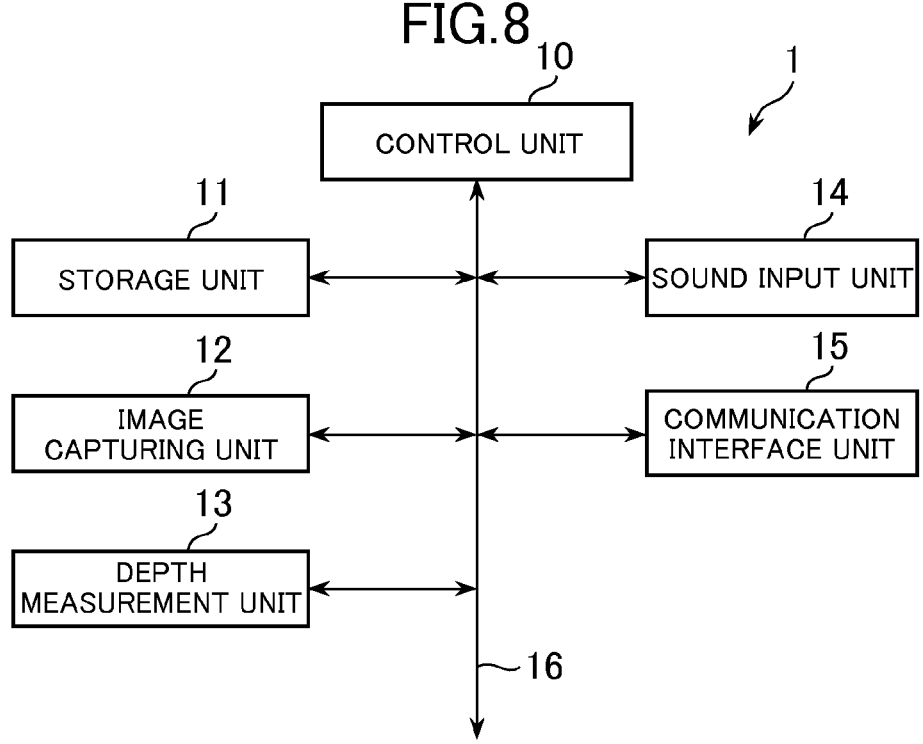
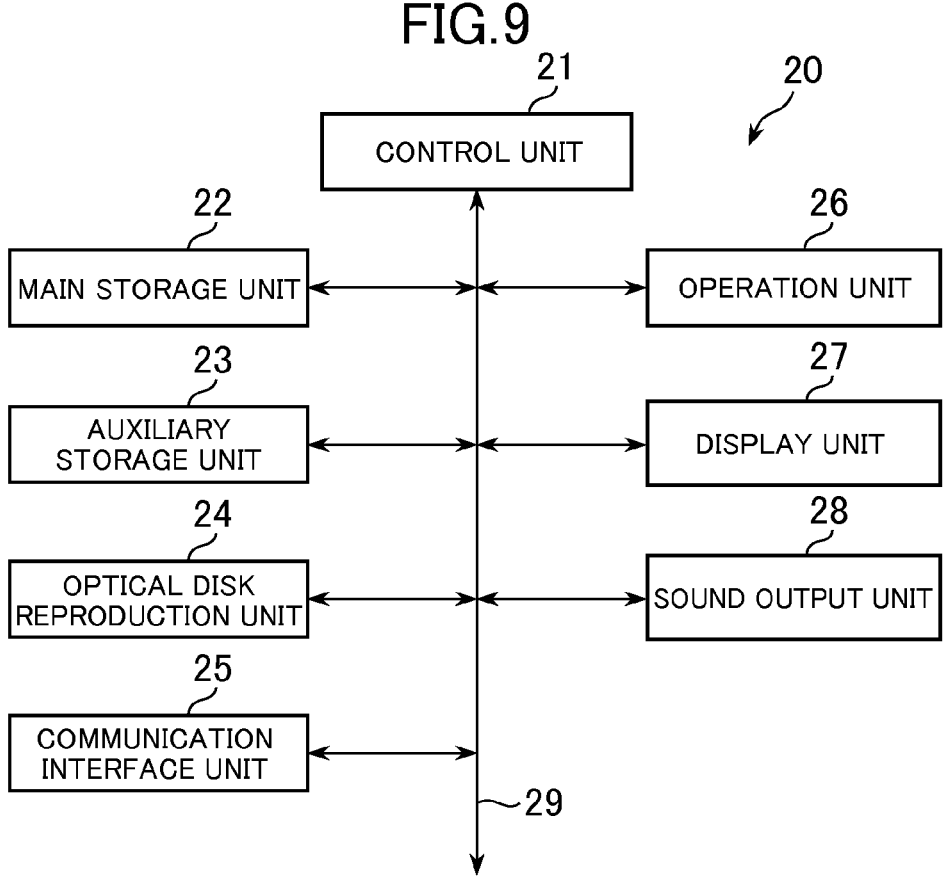

| TIMING DIFFERENCE (ΔT) | EVALUATION |
|---|---|
| 0 ≦ \|ΔT\| < T1 | MARVELOUS |
| T1 ≦ \|ΔT\| < T2 | PERFECT |
| T2 ≦ \|ΔT\| < T3 | GREAT |
| T3 ≦ \|ΔT\| < T4 | GOOD |
| T4 ≦ \|ΔT\| < T5 | ALMOST |
| T5 ≦ \|ΔT\| | BOO |

FIG.25
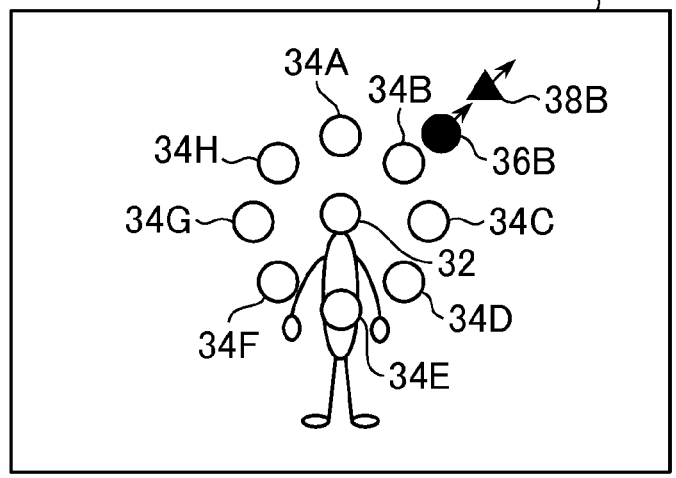
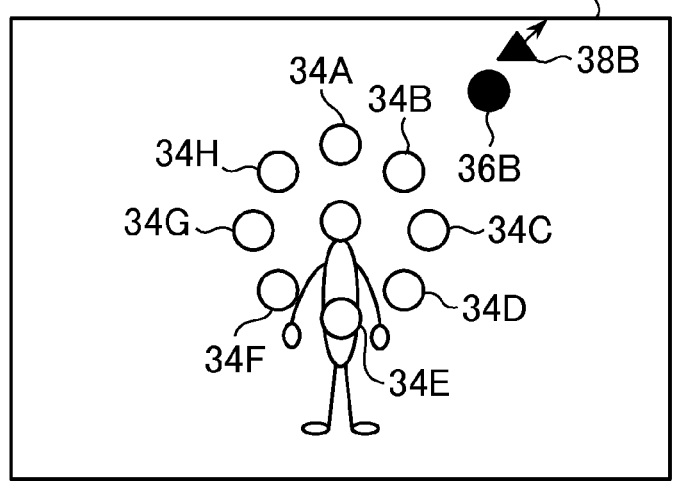
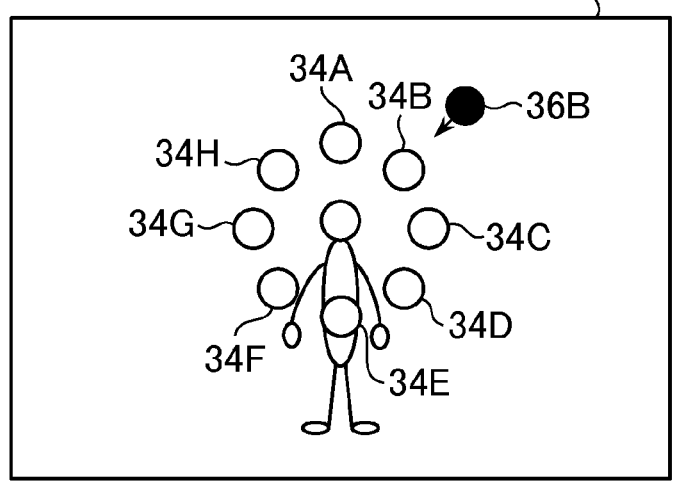

| CHANGE IN PLACE POSITION INFORMATION | DISTANCE |
|---|---|
| SMALL | NEAR |
| NORMAL | NORMAL |
| LARGE | FAR |

FIG.28
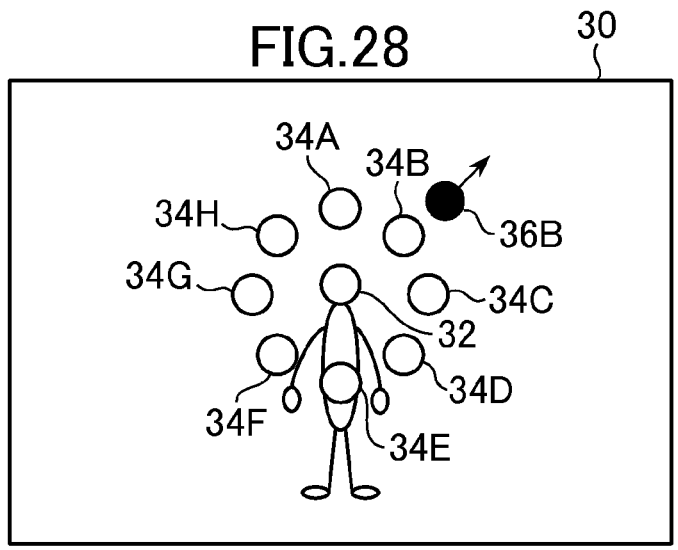
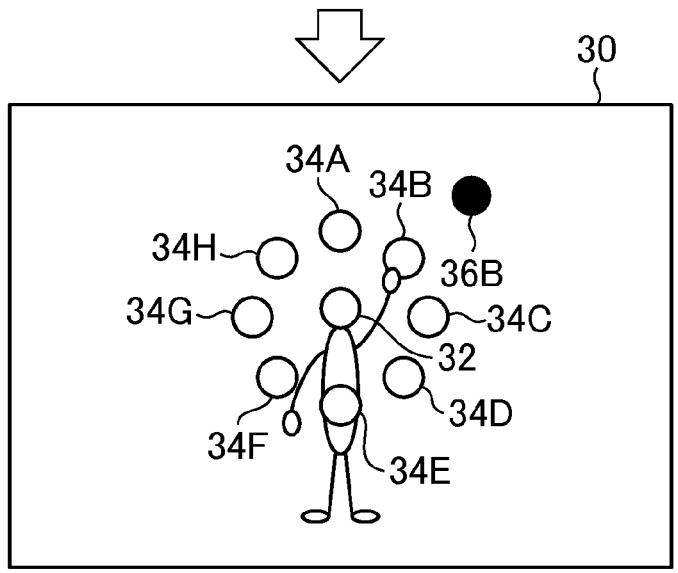
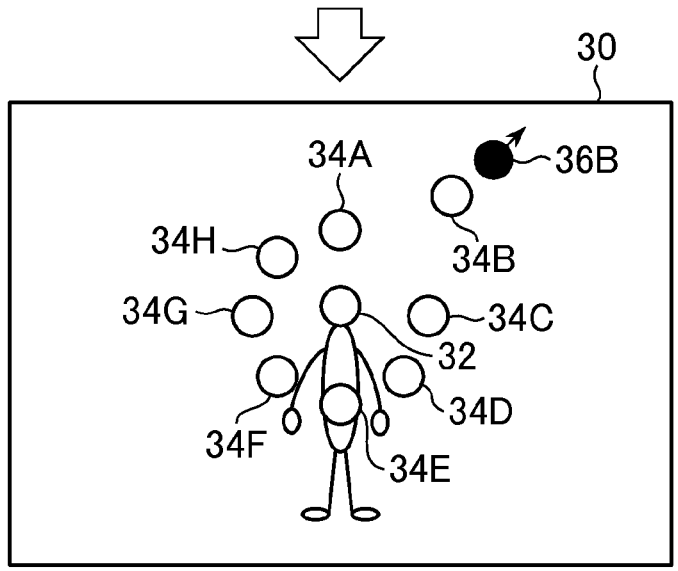

FIG.29

| CONDITION | REPLACEMENT METHOD |
|---|---|
| SCORE WITHIN PREDETERMINED RANGE | A ↔ B |

FIG.31
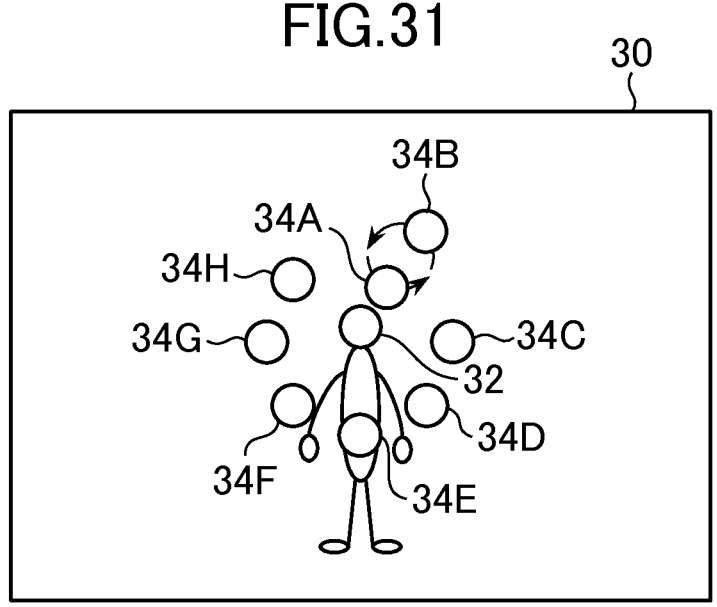
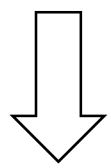
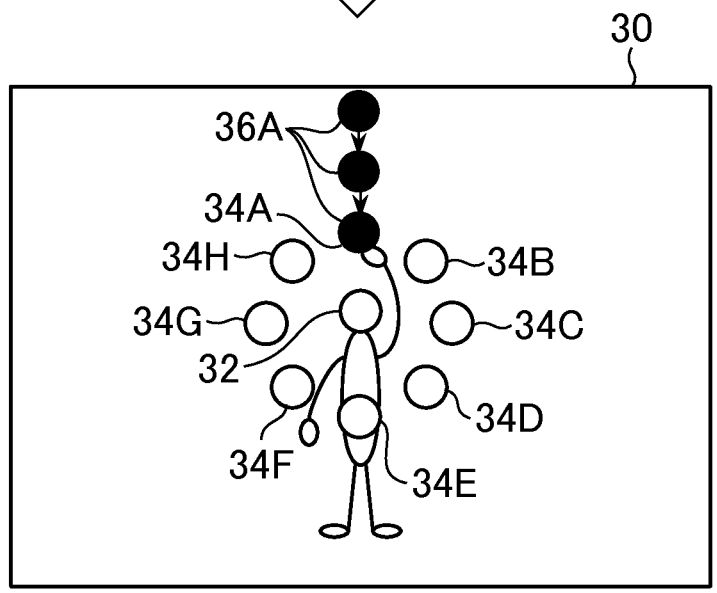

GAME DEVICE, CONTROL METHOD OF GAME DEVICE, PROGRAM, AND INFORMATION STORAGE MEDIUM

CROSS REFERENCE TO RELATED APPLICATIONS

This application is a National Stage of International Application No. PCT/JP2012/070023 filed Aug. 6, 2012, claiming priority based on Japanese Patent Application No. 2011-200725 filed on Sep. 14, 2011 and Japanese Patent Application No. 2012-169665 filed on Jul. 31, 2012. The contents of each of the above documents are incorporated herein by reference in their entirety.

TECHNICAL FIELD

The present invention relates to a game device, a control method of a game device, a program, and an information storage medium.

BACKGROUND ART

Conventionally, there has been known a game in which a player performs a game operation to the music. In such a game, a guide image is shown in a game screen to indicate to a player a reference timing at which the player should perform a game operation.

For example, Patent Document 1 discloses a technique for showing a guide image near the center of a game screen when a reference timing is coming, and then gradually moving the guide image so as to approach a determination position in accordance with the interval between the reference timing and the current timing, to thereby indicate the reference timing to the player.

CITATION LIST

Patent Literature

Patent Literature 1: Japanese Patent Laid-open Publication No. 2001-70639

SUMMARY OF INVENTION

Technical Problem

However, in a case in which a guide image moves in one direction toward the determination position to indicate the reference timing, as described in Patent Document 1, a player cannot satisfactorily perceive the rhythm of music, based on the movement of the guide image, and resultantly cannot well recognize the reference timing.

The present invention has been conceived in view of the above, and an object thereof is to provide a game device, a control method of a game device, a program, and an information storage medium for enabling a user to more readily perceive the rhythm of music when playing a game in which the player performs a game operation to the music.

Solution to Problem

In order to achieve the above described object, a game device according to the present invention is a game device for executing a game in which a player performs a game operation to music, comprising: means for obtaining reference timing data from means for storing reference timing data indicating a reference timing at which the player should perform the game operation; guide means for indicating the reference timing to the player by moving a guide image in a game screen from a generation position to a return position and thereafter moving the guide image from the return position toward the generation position, based on the reference timing data; game operation detection means for detecting the game operation by the player; and evaluation means for evaluating the game operation by the player, based on an operation timing at which the player performs the game operation and the reference timing indicated by the reference timing data.

A control method of game device according to the present invention is a control method for a game device for executing a game in which a player performs a game operation to music, comprising: a step of obtaining reference timing data from means for storing reference timing data indicating a reference timing at which the player should perform the game operation; a guide step of indicating the reference timing to the player by moving a guide image in a game screen from a generation position to a return position and thereafter moving the guide image from the return position toward the generation position, based on the reference timing data; a game operation detection step of detecting the game operation by the player; and an evaluation step of evaluating the game operation by the player, based on an operation timing at which the player performs the game operation and the reference timing indicated by the reference timing data.

A program according to the present invention is a program for causing a computer to function as a game device for executing a game in which a player performs a game operation to music, the program for causing the computer to function as: means for obtaining reference timing data from means for storing reference timing data indicating a reference timing at which the player should perform the game operation; guide means for indicating the reference timing to the player by moving a guide image in a game screen from a generation position to a return position and thereafter moving the guide image from the return position toward the generation position, based on the reference timing data; game operation detection means for detecting the game operation by the player; and evaluation means for evaluating the game operation by the player, based on an operation timing at which the player performs the game operation and the reference timing indicated by the reference timing data.

An information storage medium according to the present invention is a computer readable information storage medium storing the above described program.

According to the present invention, in a game in which a player performs a game operation to the music, the player can readily conceive the rhythm of music.

According to one aspect of the present invention, the guide means may indicate the reference timing to the player by moving the game image in the game screen from the generation position to the return position and thereafter moving the guide image from the return position to the generation position.

According to one aspect of the present invention, the guide means may show a generation position image at the generation position in the game screen, and changes the generation position image in a case where the guide image starts moving from the generation position to the return position or in a case where the guide image starts moving from the return position toward the generation position.

According to one aspect of the present invention, the guide means may change the guide image between in a case where the guide image moves from the generation position to the return position and in a case where the guide image moves from the return position toward the generation position.

According to one aspect of the present invention, the guide means may include means for indicating a first reference timing to the player by moving a first guide image from the generation position to the return position and thereafter moving the first guide image from the return position toward the generation position, and means for indicating a second reference timing that comes later than the first reference timing to the player by moving a second guide image from the generation position to the return position and thereafter moving the second guide image from the return position toward the generation position, and sets different a path on which the first guide image moves from the return position to the generation position and a path on which the second guide image moves from the generation position toward the return position in a case where the second guide image moves from the generation position toward the return position while the first guide image is moving from the return position toward the generation position.

According to one aspect of the present invention, the guide means may include means for indicating a first reference timing to the player by moving a first guide image from the generation position to a first return position and thereafter moving the first guide image from the first return position toward the generation position, and means for indicating a second reference timing that comes later than the first reference timing to the player, in a case where indicating the second reference timing to the player while the first guide image is shown in the game screen, by moving a second guide image from the generation position to a second return position different from the first return position, and thereafter moving the second guide image from the second return position toward the generation position.

According to one aspect of the present invention, the game device may further comprise means for moving in the game screen an image on a line extending from the generation position to the return position and an extended line thereof without return at the return position.

According to one aspect of the present invention, the game operation detection means may include means for determining an amount of operation of the game operation, and the guide means includes means for determining a distance between the generation position and the return position, based on the amount of operation of the game operation, in a case where the game operation is evaluated, and moves the guide image for indicating the reference timing that comes after the game operation is performed from the generation position to the return position that is away by the distance determined and thereafter moving the guide image from the return position toward the generation position.

According to one aspect of the present invention, the guide means may includes means for determining, whether or not the game operation is performed, in a case where the guide image arrives at the return position, and means for changing, the generation position, based on the return position, and then changing the return position, based on the generation position changed, in the case where it is determined that the game operation is performed, in a case where the guide image arrives at the return position, and moves the guide image for indicating the reference timing that comes after the game operation is performed, from the generation position changed to the return position changed, and thereafter moves the guide image from the return position changed to the generation position changed.

According to one aspect of the present invention, the game operation detection means may detect a plurality of kinds of game operations, the reference timing data indicates, with respect to each of the plurality of kinds of game operations, a reference timing at which to perform that game operation, a plurality of generation positions are set in the game screen, each of the plurality of generation positions is correlated to any of the plurality of kinds of game operations, and the guide means moves, with respect to each of the plurality of generation positions, the guide image for indicating a reference timing at which to perform the game operation correlated to that generation position, from the generation position to the return position that is set, based on a line extending from the reference position to the generation position or an extended line thereof in the game screen, and thereafter moves the guide image from the return position toward the generation position.

According to one aspect of the present invention, the game operation detection means may detects a first kind of game operation and a second kind of game operation, the reference timing data includes first reference timing data indicating a first reference timing at which to perform the first kind of game operation and second reference timing data indicating a second reference timing at which to perform the second kind of game operation, the guide means includes means for indicating the first reference timing to the player by moving a first guide image from a first generation position to a first return position and thereafter moving the first guide image from the first return position toward the first generation position, and means for indicating the second reference timing to the player by moving a second guide image from a second generation position to a second return position, and thereafter moving the second guide image from the second return position toward the second generation position, the game device further comprises means for replacing the first reference timing data by the second reference timing data while the game is being executed, and in a case where the first reference timing data is replaced by the second reference timing data, the guide means indicates replacement of the first reference timing data by the second reference timing data to the game player by moving an image from the second generation position to the first generation position in the game screen.

BRIEF DESCRIPTION OF DRAWINGS

FIG. 5 shows one example of player position information generated by a position determination device;
FIG. 8 shows a hardware structure of the position determination device;
FIG. 9 shows a hardware structure of a game device.

FIG. 25 shows a correlation between change of player position information and a determination method for a return position;

FIG. 28 shows a generation position being changed;

FIG. 29 shows a correlation between a condition on a situation of an ongoing game and a replacement method for a reference timing;

FIG. 31 shows shifting of a game screen when the reference timing data is exchanged.

DESCRIPTION OF EMBODIMENTS

1. Embodiment

In the following, an example of an embodiment of the present invention will be described in detail, based on the drawings. A game device according to an embodiment of the present invention is implemented using, for example, a consumer game device (an installed type game device), a portable game device, a portable phone, a personal digital assistant (PDA), a personal computer, or the like. Below, a case will be described in which a game device according to an embodiment of the present invention is implemented using a consumer game device.

Figure 1:
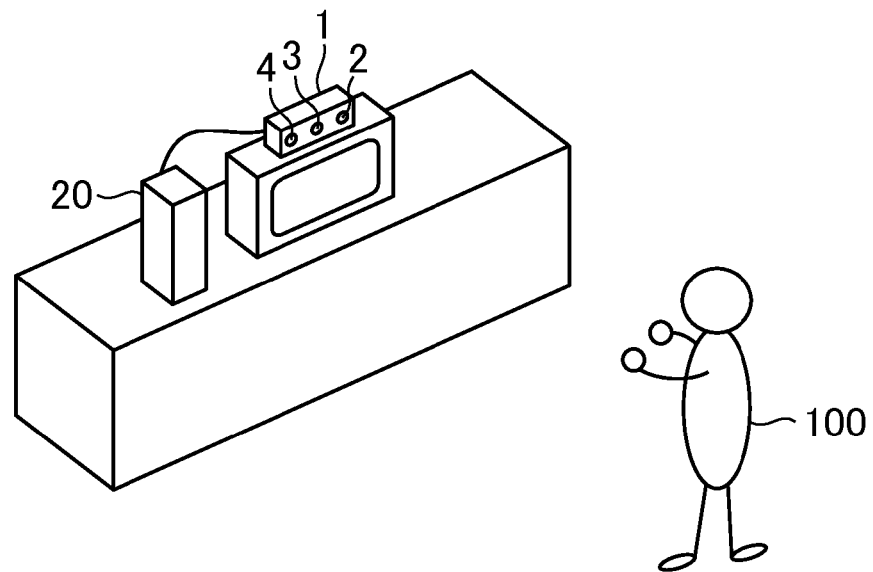
FIG. 1 shows a player playing a game.

FIG. 1 shows a player playing a game. As shown in FIG. 1, a player 100 is positioned, for example, in front of a position determination device 1. The position determination device 1 and a game device 20 are connected with each other for data communication.

2. Operation of Position Determination Device

Initially, the position determination device 1 will be described. The position determination device 1 generates player position information on the position of a player in a 3D space. In this embodiment, a case will be described in which the position information on a player includes information on the positions of a plurality of parts of the player 100's body. A part of the player 100's body refers to, for example, a head, both arms, and so forth.

As shown in FIG. 1, the position determination device 1 includes, for example, a CCD camera 2, an infrared sensor 3, a microphone array 4 including a plurality of microphones, and so forth.

The CCD camera 2 is a publicly known camera including a CCD image sensor, and generates a captured image (for example, an RGB digital image) obtained by capturing an image of the player 100 for every predetermined period of timing (for example, every 1/60 of a second).

Figure 2:
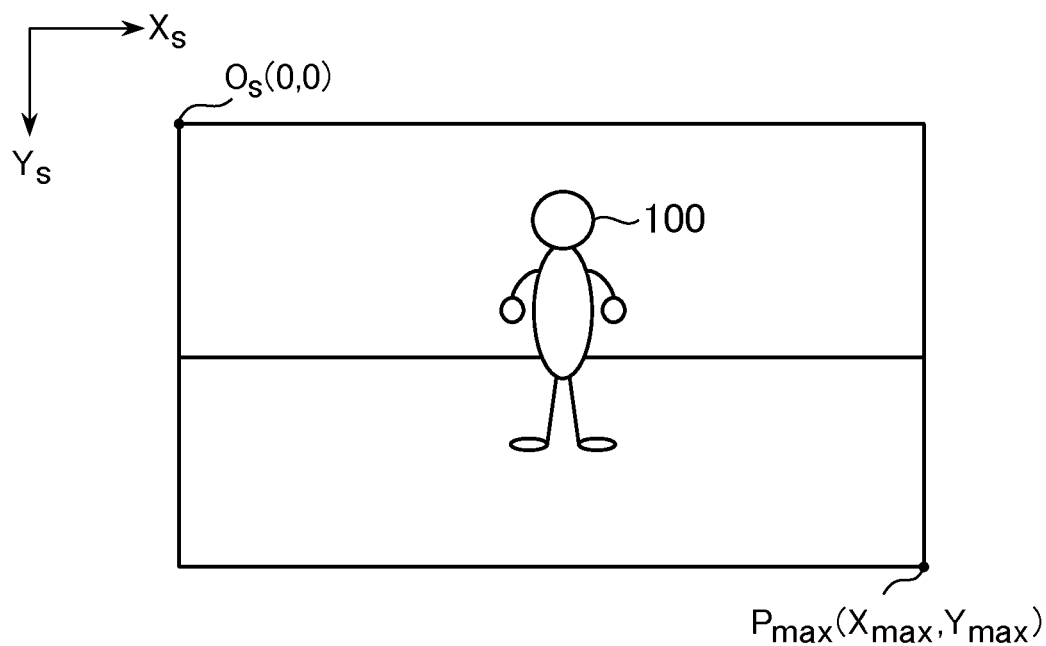
FIG. 2 shows one example of a captured image generated by a CCD camera.

FIG. 2 shows one example of a captured image generated by the CCD camera 2. As shown in FIG. 2, for example, the player 100 is included in a captured image. In a captured image, an Xs axis and a Ys axis are defined orthogonal to each other. For example, the upper left of a captured image is defined as the origin Os (0, 0), and the lower right of a captured image as coordinates Pmax (Xmax, Ymax). The position of each of the pixels corresponding to a captured image is specified by 2D coordinates (Xs-Ys coordinates) allocated to the pixel.

The infrared sensor 3 includes, for example, an infrared emitting device and an infrared receiving device (for example, an infrared diode). The infrared sensor 3 detects a reflected light obtained by emitting infrared light. The infrared sensor 3 measures the depth of an image capture object (for example, the player 100), based on a result of detection with the reflected light.

The depth of an image capture object refers to a distance interval between a measurement reference position and an image capture object. A measurement reference position refers to a position that makes a reference in measurement of the depth (depth) of the position of the player 100, and may be any predetermined position correlated to the position of the position determination device 1, being, for example, the position of the infrared receiving device of the infrared sensor 3. The infrared sensor 3 measures the depth of the player 100, based on, for example, a time of flight from emission of infrared radiation to reception of a reflected light, or TOF (time of flight).

Figure 3:
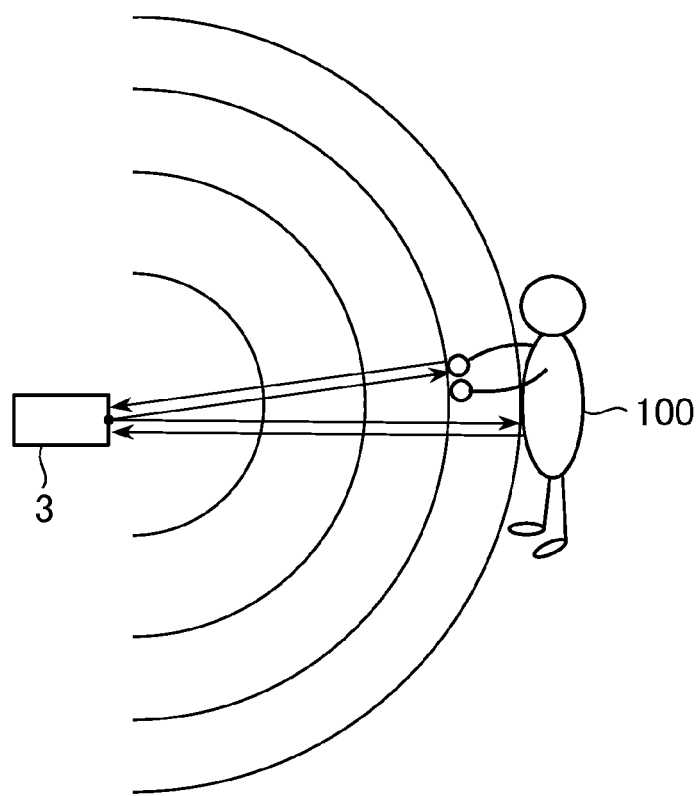
FIG. 3 explains a measurement method for measuring a depth of a player by an infrared sensor.

FIG. 3 explains a method for measuring the depth of the player 100 by the infrared sensor 3. As shown in FIG. 3, the infrared sensor 3 emits infrared radiation pulse at a predetermined interval. The infrared radiation emitted from the infrared sensor 3 spreads spherically with the light emitting position as the center.

The infrared radiation emitted from the infrared sensor 3 hits on the surface of the body of the player 100, for example. The infrared radiation hits on the surface is reflected. The reflected infrared radiation is detected by the infrared receiving device of the infrared sensor 3. That is, the infrared sensor 3 detects a reflected light of which phase is reversed by 180 degrees relative to the infrared radiation emitted.

For example, as shown in FIG. 3, when the player 100 has his/her both hands extending forward, the extending hands are positioned closer to the infrared sensor 3 than the body of the player 100 is. That is, the time of flight of the infrared radiation reflected by the both hands of the player 100 is shorter than that of the infrared radiation reflected by the body of the player 100.

A value obtained by multiplying a period of time (that is, the time of flight) from emission of infrared radiation by the infrared sensor 3 to detection of a reflected light and the speed of the infrared radiation and then halving corresponds to the distance interval (that is, the depth) between the measurement reference position and the player 100. With this processing performed, the infrared sensor 3 measures the depth of the player 100.

Further, the infrared sensor 3 determines a depth difference obtained based on the reflected infrared radiation to thereby determine the contour of an image capture object (the player 100). As described above, reception of the reflected infrared radiation by the infrared sensor 3 means presence of an object at the position. Further, unless any other object is placed near behind the object, a large depth difference is resulted between the object and the surroundings of the object. For example, connecting the positions with a depth difference larger than a predetermine value results in determination of the contour of the player 100.

Note that a method for determining the contour of the player 100 is not limited to the above described example. Alternatively, a contour may be determined, based on the brightness of each pixel of a captured image obtained by the CCD camera 2, for example. In this case as well, for example, connecting the points with a large difference in the brightness between pixels results in determination of the contour of the player 100.

Information on the depth (depth information) of the player 100, determined as described above is expressed as a depth image, for example. In this embodiment, a case will be described as an example in which the depth information is expressed as a depth image in gray scale (for example, image data in gray scale of 256 bits).

Figure 4:
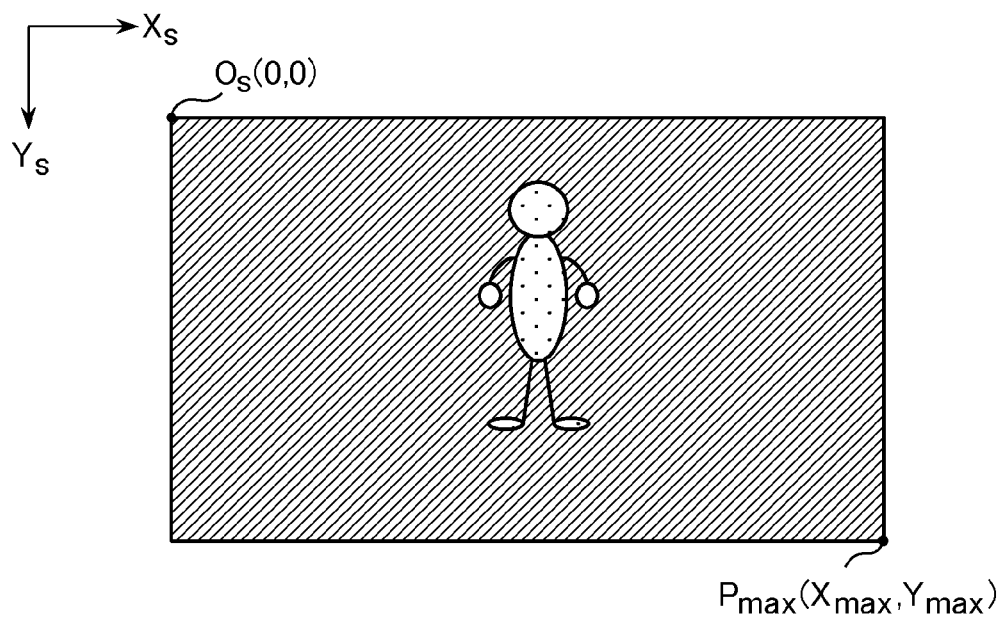
FIG. 4 shows one example of a depth image obtained by the infrared sensor.

FIG. 4 shows one example of the depth image obtained by the infrared sensor 3. As shown in FIG. 4, for example, an object located closer to the infrared sensor 3 is expressed brighter (higher brightness), while an object located farther from the infrared sensor 3 is expressed darker (lower brightness). The depth of the player 100 corresponds to the brightness (a pixel value) of the depth image.

For example, when the depth image is expressed as image data in gray scale of 256 bits, the brightness of the depth image differs by one bit for every difference of 2 cm in the depth of the player 100. This means that the infrared sensor 3 can determine the depth of an image capture object in units of 2 cm. When the player 100 has his/her both hands extending forward (FIG. 3), the pixels corresponding to the both hands of the player 100 are shown brighter (higher brightness) than those corresponding to the body, as shown in FIG. 4.

In this embodiment, the infrared sensor 3 generates a depth image for every predetermined period of time (for example, every 1/60 of a second), similar to the CCD camera 2. The player position information on the position of a part of the player 100's body is generated, based on a captured image obtained by the CCD camera 2 and the depth image obtained by the infrared sensor 3.

For example, a captured image (RGB data) obtained by the CCD camera 2 is combined with depth information (depth) indicated by the depth image to thereby generate a combined image (RGBD data). That is, the combined image includes color information (brightness of each of RGB) and the depth information with respect to each pixel.

In generation of the player position information based on the combined image, initially, a pixel corresponding to the contour of the player 100 is specified, based on the depth image. Thereafter, with reference to the color information (RBG brightness) of a pixel enclosed by the contour in the combined image, a pixel corresponding to each part of the body of the player 100 is specified, based on the color information of the combined image. As a specifying method, for example, a public known method is applicable, including a pattern matching method for extracting an object (that is, each part of the body of the player 100) from an image through comparison with a comparison image (a teacher image), or the like.

Based on the pixel value (an RGBD value) of the pixel specified as described above, 3D coordinates of the head, shoulder, or the like, of the player 100 are calculated. For example, predetermined matrix conversion processing is applied to the pixel value to thereby generate 3D coordinates. This matrix conversion processing is executed in a matrix operation similar to conversion processing for two coordinate systems, namely, the world coordinates and screen coordinates, in 3D graphics. That is, an RGB value indicating color information of a pixel and a D value indicating a depth are substituted into a predetermined matrix expression to calculate the 3D coordinates of the pixel.

As a method for calculating the 3D coordinates of a pixel, based on a pixel value (an RGBD value), a publicly known method is applicable. The calculation method is not limited to the above described example. That is, coordinate conversion may be made, using a look-up table, or the like, for example.

FIG. 5 shows one example of the player position information generated by the position determination device 1. As shown in FIG. 5, the player position information includes a plurality of information items concerning the positions of a plurality of parts of the player 100's body. The player position information is stored, for example, such that each part of the player 100's body is correlated to 3D coordinates.

Figure 6:
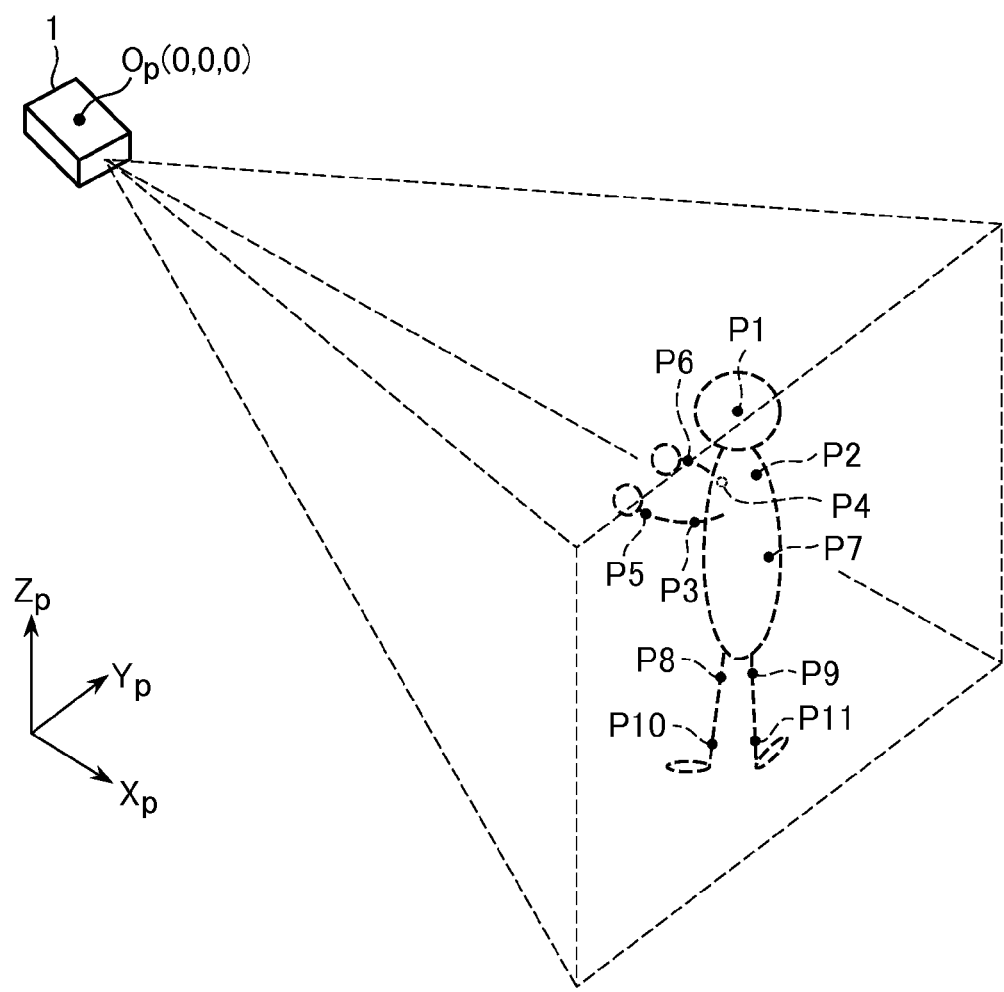
FIG. 6 shows a position of a player specified by the player position information.

FIG. 6 shows a position of the player 100 specified by the player position information. In this embodiment, for example, a predetermined position (for example, a measurement reference position) corresponding to the position determination device 1 is defined as the origin Op. For example, the origin Op is the 3D coordinates corresponding to the measurement reference position of the infrared sensor 3. Note that the origin Op may be set at any position in the 3D space where the player 100 is present. For example, the 3D coordinates corresponding to the origin Os of a captured image may be set as the origin Op.

As shown in FIG. 6, in this embodiment, a case will be described in which the player position information includes part information on the positions of at least the head and hips among the plurality of parts of the player 100's body. For example, the player position information includes eleven sets of 3D coordinates corresponding to the head P1, the shoulder P2, the upper left arm P3, the upper right arm P4, the lower left arm P5, the lower right arm P6, the back P7, the left thigh P8, the right thigh P9, the left shin P10, and the right shin P11 of the player 100.

A part of the body of the player 100 indicated by the player position information may be a predetermined part of the body (skeleton) of the player. For example, the part may be any part of a body that can be specified according to the above described pattern matching method.

For example, the player position information generated for every predetermined interval (for example, every 1/60 of a second) is sent from the position determination device 1 to the game device 20. The game device 20 receives the player position information from the position determination device 1 to obtain a motion of the body of a player (the reference numeral "100" for a player will be hereinafter omitted) and executes a game.

3. Game Executed in Game Device

In the game device 20, a game is executed in which a player performs a game operation to the music. In this game, for example, a player shown in a captured image obtained from the position determination device 1 is shown in a game screen.

Figure 7:
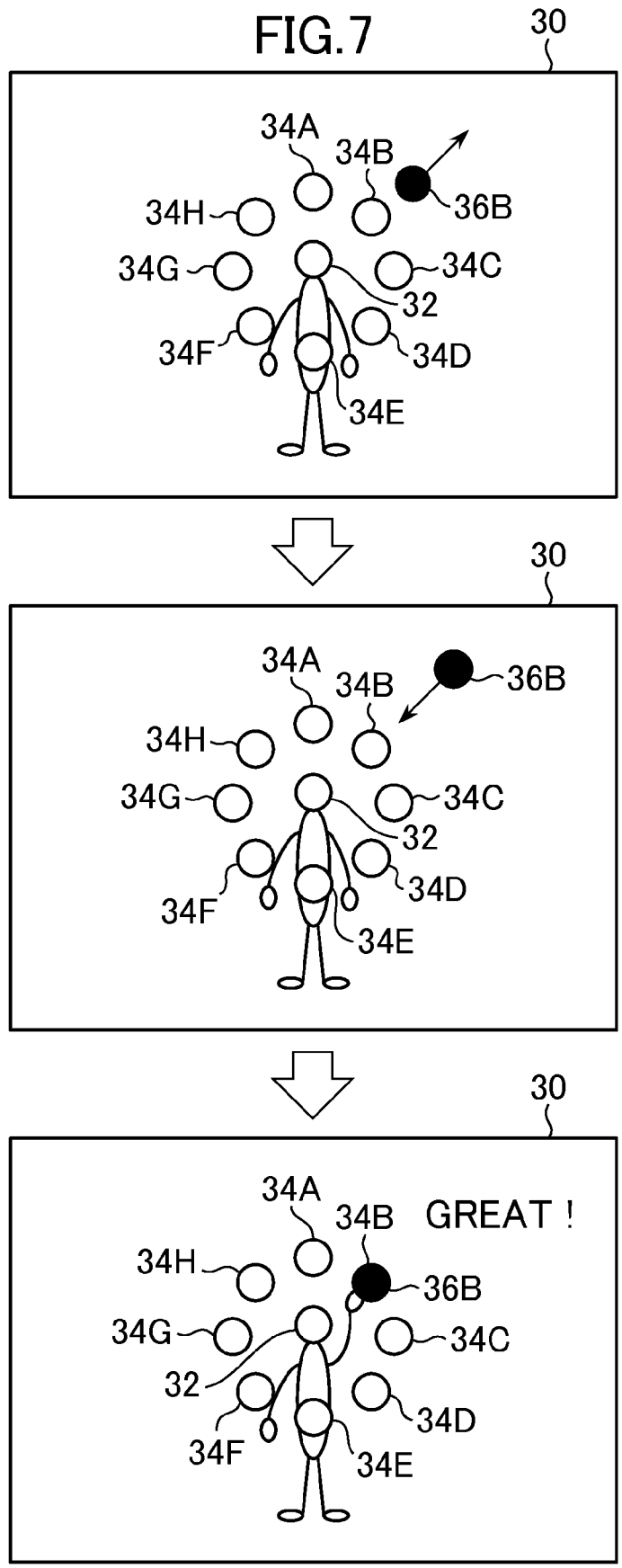
FIG. 7 shows one example of a game screen.

FIG. 7 shows one example of a game screen. As shown in FIG. 7, a player image 32 obtained by capturing an image of a player and a plurality of generation position marks 34 arranged around the player image 32 are shown in the game screen 30. As a game is played with a player facing the player image 32 shown in the game screen 30, an image obtained by extracting the contour of the player from a captured image and applying left-right reverse processing is shown as the player image 32 here.

As the player image 32 is shown, based on a captured image, the player image 32 shown is updated in accordance with a motion, when made, of the body of a player. For example, when a player raises his/her right hand, the player image 32 shown is updated such that the hand on the right side viewed from the player in the actual space rises.

Eight generation position marks 34 (the generation position marks 34A to 34H) are arranged in circle surrounding the player image 32, for example. The display position of the generation position mark 34 corresponds to the "generation position" according to the present invention. That is, a plurality of generation positions are set in the game screen 30. That is, here, a plurality of generation positions are set around the reference position (the display position of the player image 32).

A timing indicator mark 36 is shown near the generation position mark 34. The timing indicator mark 36 is generated from the position of the generation position mark 34 when a reference timing is coming. Then, as shown in FIG. 7, the timing indicator mark 36 moves departing from the generation position mark 34 as time passes, and then stops before moving to approach the generation position mark 34. A point of return for the timing indicator mark 36 corresponds to the "return position" according to the present invention. When a reference timing has come, the timing indicator mark 36 overlaps the generation position mark 34.

As shown in FIG. 7, when a player actually moves his/her body such that the player shown as the player image 32 touches the generation position mark 34 at a timing when the timing indicator mark 36 overlaps the generation position mark 34, the player wins high evaluation. That is, in this embodiment, a player's actual moving his/her body such that the player shown as the player image 32 touches the generation position mark 34 corresponds to a "game operation".

As described above, in the game device 20, when a reference timing at which a player should perform a game operation is coming, the timing indicator mark 36 starts moving from the generation position mark 34 to reciprocate. This makes it more readily for a player to perceive the rhythm of music, based on the return movement of the timing indicator mark 36, compared to an arrangement, for example, in which the timing indicator mark 36 moves in one direction. As a result, a player can more readily recognize a reference timing. Below, this technique will be described in detail.

Initially, a hardware structure of the position determination device 1 and the game device 20 will be described.

4. Structure of Position Determination Device

FIG. 8 shows a hardware structure of the position determination device 1. As shown in FIG. 8, the position determination device 1 includes a control unit 10, a storage unit 11, an image capturing unit 12, a depth measurement unit 13, a sound input unit 14, and a communication interface unit 15. Each of the structural elements of the position determination device 1 is connected with each other for data communication via a bus 16.

The control unit 10 controls the respective units of the position determination device 1, based on an operating system and various programs stored in the storage unit 11.

The storage unit 11 stores an operating system, a program for operating the image capturing unit 12 and the depth measurement unit 13, and various parameters. The storage unit 11 stores a program for generating the player position information, based on a captured image and a depth image.

The image capturing unit 12 includes the CCD camera 2 or the like. The image capturing unit 12 generates a captured image of a player, for example. The depth measurement unit 13 includes an infrared sensor 3 or the like. The depth measurement unit 13 generates a depth image, based on a time of flight obtained by the infrared sensor 3, for example. The control unit 10 generates the player position information for every predetermined period of time (for example, every 1/60 of a second), based on a captured image generated by the image capturing unit 12 and a depth image generated by the depth measurement unit 13, as described above.

The sound input unit 14 includes a microphone array 4 or the like. The communication interface unit 15 is an interface for sending various kinds of data, such as the player position information or the like, to the game device 20.

5. Structure of Game Device

FIG. 9 shows a hardware structure of the game device 20. As shown in FIG. 9, the game device 20 includes a control unit 21, a main storage unit 22, an auxiliary storage unit 23, an optical disk reproduction unit 24, a communication interface unit 25, an operation unit 26, a display unit 27, and a sound output unit 28. The respective units of the game device 20 are connected to each other via a bus 29.

The control unit 21 includes, for example, a CPU, a GPU (Graphics Processing Unit), and an SPU (Sound Processing Unit), or the like. The control unit 21 executes various processing according to an operating system and other programs.

The main storage unit 22 includes, for example, a RAM (Random Access Memory). The auxiliary storage unit 23 includes, for example, a hard disk device (an information storage medium). The main storage unit 22 stores a program and data read from the auxiliary storage unit 23 or the optical disk (an information storage medium). The main storage unit 22 is used also as a working memory for storing data necessary in processing. Further, for example, the main storage unit 22 temporarily stores the player position information received from the position determination device 1 so as to be correlated to the time of reception.

The optical disk reproduction unit 24 reads a program and data recorded in an optical disk. In an optical disk, for example, a game program is recorded.

The communication interface unit 25 is an interface for connecting the game device 20 to a communication network for communication. The game device 20 obtains the player position information from the position determination device 1 via the communication interface unit 25.

The operation unit 26 is use for various operations by a player. The operation unit 26 includes, for example, a game controller, a touch panel, a mouse, a keyboard, or the like. The display unit 27 is, for example, a home-use television set receiver, a liquid crystal display panel, or the like. The display unit 27 shows a screen image according to an instruction from the control unit 21. The sound output unit 28 includes, for example, a speaker, a headphone, or the like.

In this embodiment, a case will be described in which a program and data necessary in executing a game is supplied via an optical disk to the game device 20. Alternatively, the program and data may be supplied to the game device 20 via other information storage medium (for example, a memory card). Still alternatively, a program and data may be supplied from a remote place to the game device 20 via a communication network.

6. Function Implemented in Game Device

Figure 10:
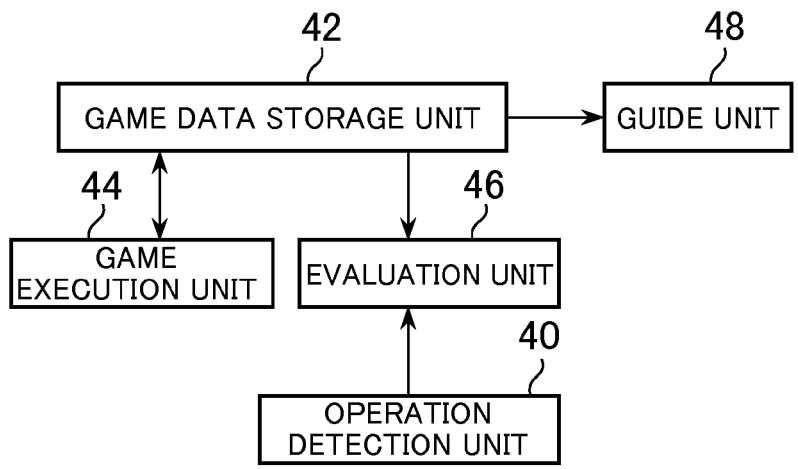
FIG. 10 is a function block diagram showing a function implemented in the game device.

FIG. 10 is a function block diagram showing functions implemented in the game device 20. As shown in FIG. 10, in the game device 20, a game operation detection unit 40, a game data storage unit 42, a game execution unit 44, an evaluation unit 46, and a guide unit 48 are implemented. These functions are implemented by the control unit 21 by operating according to a program read from an optical disk.

6-1. Game Operation Detection Unit

The game operation detection unit 40 is implemented using mainly the control unit 21. The game operation detection unit 40 detects a game operation by a player. Below, a case will be described in which the game operation detection unit 40 detects a plurality of kinds of game operations (a plurality of kinds of game operations). For example, the game operation detection unit 40 determines whether or not the position of each part of a player's body indicated by the player position information is within a predetermined range, to thereby detect a game operation by a player.

Figure 11:
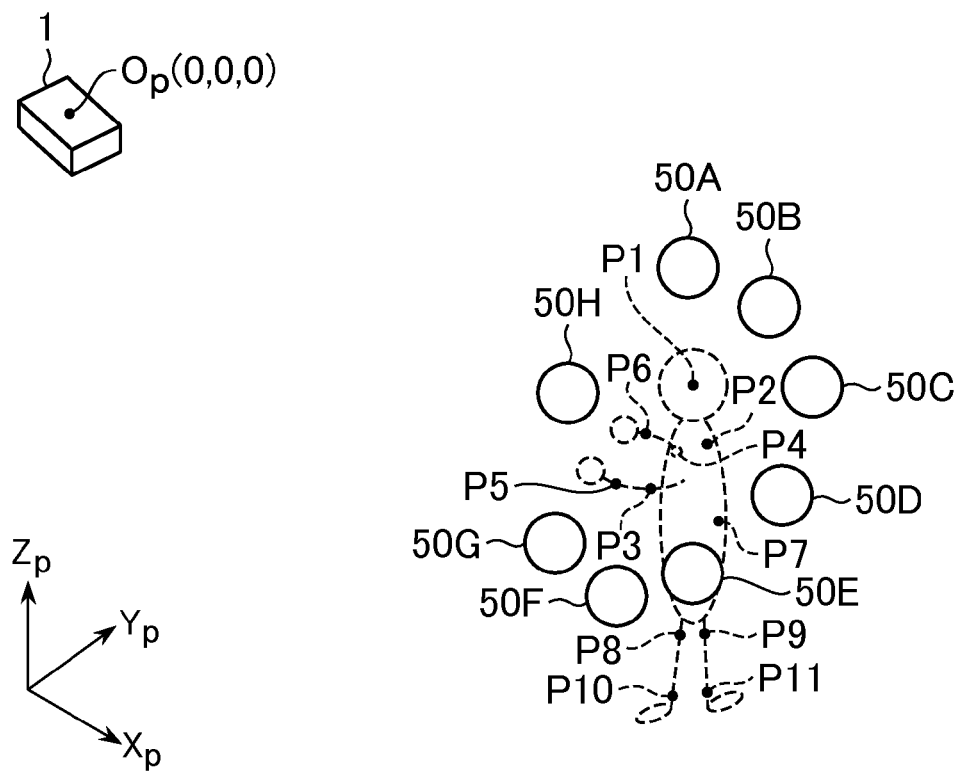
FIG. 11 explains a detection method for a game operation.

FIG. 11 explains a game operation detection method. As shown in FIG. 11, for example, a determination area 50 for determining whether or not a game operation has been performed is set in a 3D coordinate space indicated by the player position information. In this embodiment, the number (for example, eight) of determination areas 50 same as that of the generation position marks 34 are set. For example, a determination area 50A corresponds to a generation position mark 34A. Similarly, respective determination areas 50B to 50H correspond to respective generation position marks 34B to 34H.

For example, the position of the determination area 50 in the 3D space is determined based on the position of the generation position mark 34. For example, the determination area 50 is set such that a positional relationship between the position of a player indicated by the player position information and the position of the determination area 50 corresponds to a positional relationship between the position of the player image 32 and the position of the generation position mark 34 in the game screen 30. For example, when the generation position mark 34 is set around the player image 32 as shown in FIG. 7, the determination area 50 is set near the back P7 of the player, as shown in FIG. 11.

The size of the determination area 50 may be predetermined or determined based on the size of the generation position mark 34. As shown in FIG. 11, for example, the determination area 50 may have a round shape having a predetermined radius.

Whether or not the 3D coordinates of each part of a player's body indicated by the player position information are positioned within the determination area 50 is determined, to thereby detect a game operation by a player. That is, when the 3D coordinates of a part of a player's body indicated by the player position information are within the determination area 50, it is determined that a player has performed a game operation.

In this embodiment, eight kinds of game operations correlated to eight respective determination areas 50A to 50H are detected. The game operation detection unit 40 determines in which of the determination areas 50A to 50H a part of a player's body indicated by the player position information is positioned, to thereby determine which kind of game operation has been performed.

As described above, in this embodiment, the game operation detection unit 40 includes a position obtaining unit for obtaining 3D position information from a position information generation unit (for example, the position determination device 1) for generating 3D position information on the position of a player in the 3D space (for example, player position information), based on a captured image obtained from the image capturing unit 12 for capturing an image of a player (FIG. 2) and depth information on the distance between the measurement reference position of the depth measurement unit 13 and the player (FIG. 4), and detects a game operation by a player, based on the 3D position information.

Note that the information indicating the position and size of the determination area 50 set in the 3D coordinates space is stored in the game data storage unit 42 to be described later. Further, the player position information obtained from the position determination device 1 is stored in the game data storage unit 42 in time series. Note that a game operation is not limited to a game operation of touching the determination area 50, and a game operation of keeping touching the determination area 50 for a predetermined period of time may correspond to a "game operation".

6-2. Game Data Storage Unit

The game data storage unit 42 is implemented mainly using the main storage unit 22 and the auxiliary storage unit 23. The game data storage unit 42 stores information necessary to execute a game. For example, data such as those below are stored in the game data storage unit 42.

(1) music data (general popular music or the like stored in a predetermined data format);
(2) reference timing data;
(3) determination area data indicating the determination area 50 set in a 3D space;
(4) data including player position information in time series; and
(5) game situation data describing a situation (a score, an elapsed period of time, and so forth) in an ongoing game.

Among the above described data, the music data and the reference timing data are data prepared in advance by a game creator. The determination area data is generated when a game is executed. The player position information is generated by the position determination device 1. The game situation data is generated and updated by a game program.

The reference timing data indicates a reference timing at which a player should perform a game operation. The reference timing data is generated in consideration of the tempo (rhythm) of music, for example. Below, a case will be described in which the reference timing data indicates a reference timing, with respect to each of a plurality of kinds of game operations (for example, eight kinds of game operations), at which to perform that game operation.

Figure 12:
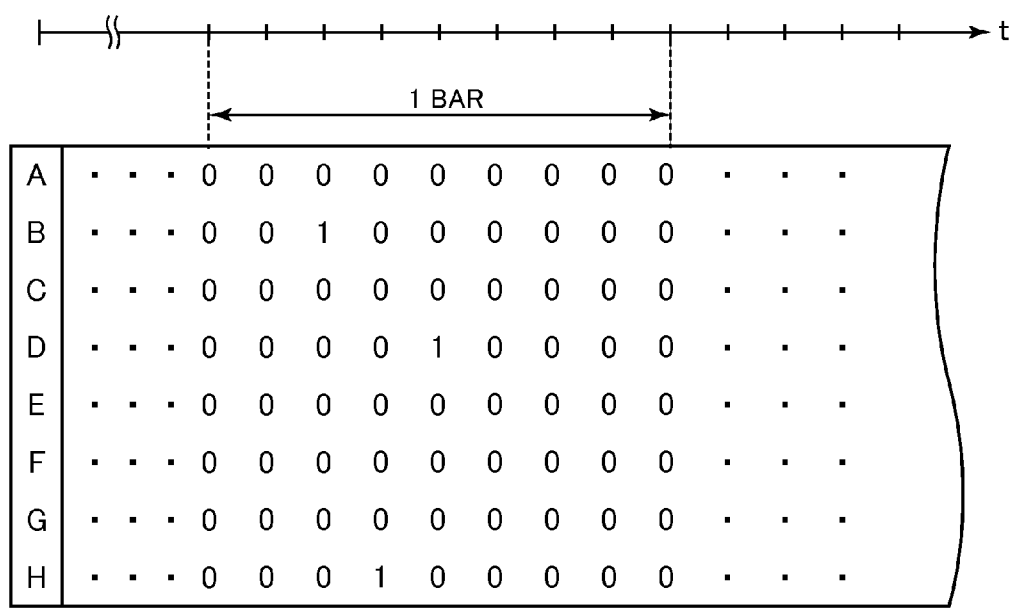
FIG. 12 shows one example of reference timing data.

FIG. 12 shows one example of the reference timing data. The t axis shown in FIG. 12 is a time axis. The t axis indicates a period of time elapsed after music reproduction has started. In this embodiment, the reference timing data indicates in units of $1/256$ bar a timing at which a player should perform a game operation. Note that, for brevity of description, FIG. 12 shows data in which one bar is divided into eight. That is, a reference timing is shown in units of ⅛ bar.

As shown in FIG. 12, at each timing at ⅛ bar, whether or not a player should perform a game operation is indicated by data of eight bits. That is, as to each of the eight kinds of game operations, whether or not that game operation should be performed is determined. In FIG. 12, the bits "A" to "H" indicate whether or not a player should touch the respective determination areas 50A to 50H.

The bit "A" being "0" means that a player should not move his/her body such that a part thereof is positioned in the determination area 50A. Meanwhile, the bit "A" being "1" means that a player should move his/her body such that a part thereof is positioned in the determination area 50A.

This is similarly applicable to the bits "B" to "H". That is, the respective bits "B" to "H" being "0" mean that a player should not move his/her body such that the respective parts thereof are positioned within the respective determination areas 50B to 50H. Meanwhile, the respective bits "B" to "H" being "0" mean that a player should move his/her body such that the respective parts thereof are positioned within the respective determination areas 50B to 50H.

As described above, a timing at which at least one of the eight bit data indicates "1" is a reference timing, and data in which at least one of the eight bits of the data indicates "1" is data indicating a reference timing.

That is, in a case where a first kind of game operation (for example, a game operation of touching the determination area 50A) and a second kind of game operation (for example, a game operation of touching the determination area 50B) are detected, the reference timing data includes first reference timing data (for example, data "A") indicating a first reference timing at which to perform the first kind of game operation and second reference timing data (for example, data "B") indicating a second reference timing at which to perform the second kind of game operation.

Note that the data stored in the game data storage unit 42 is not limited to the above example, and various kinds of data for executing a game may be stored in the game data storage unit 42. Further, any other data, such as image data on the generation position mark 34 or the timing indicator mark 36, for example, may be stored. Further, the control unit 21 functions as means for obtaining the various kinds of data stored in the game data storage unit 42.

6-3. Game Execution Unit

The game execution unit 44 is implemented using mainly the control unit 21. The game execution unit 44 executes a game in which a player performs a game operation to the music. For example, the game execution unit 44 updates the game situation data, based on an algorithm defined in a game program, to thereby execute a game.

6-4. Evaluation Unit

The evaluation unit 46 is implemented using mainly the control unit 21. The evaluation unit 46 evaluates a game operation by a player, based on an operation timing at which the player performs the game operation and the reference timing indicated by the reference timing data. For example, the evaluation unit 46 evaluates a game operation, based on the difference between the reference timing indicated by the reference timing data and the operation timing at which a player actually performs the game operation. For example, a smaller difference between the reference timing and the operation timing results in higher evaluation on the game operation.

In this embodiment, any of the evaluations "MARVELOUS", "PERFECT", "GREAT", "GOOD", "ALMOST", and "BOO" is made, based on the difference in the timing between a timing at which the timing indicator mark 36 departing from the generation position mark 34 has returned to the generation position mark 34 (a reference timing) and a timing at which a part of a player's body indicated by the player position information has actually entered the determination area 50 (an operation timing).

Figures 13, 14:
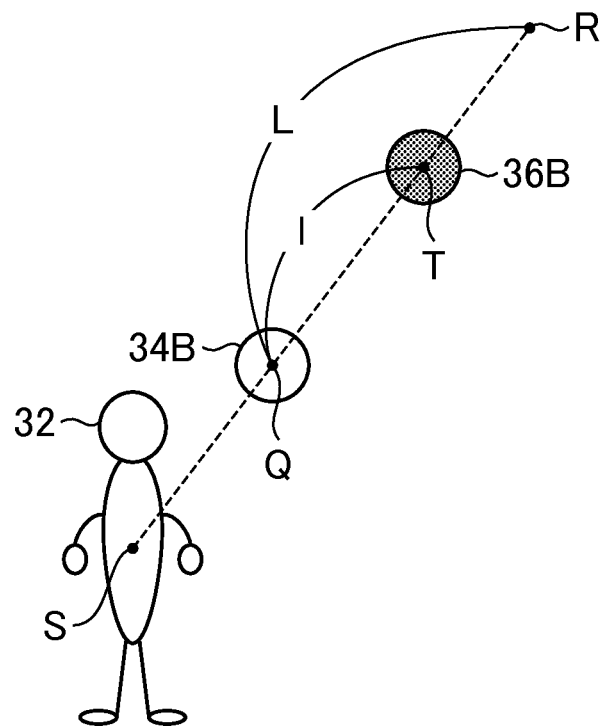
FIG. 13 shows a correlation between a timing difference (ΔT) and an evaluation.
FIG. 14 explains a movement method for a timing indicator mark.

FIG. 13 shows a correlation between a timing difference (ΔT) and an evaluation. Data indicating this correlation may be stored in the game data storage unit 42, for example. For example, the timing difference (ΔT) takes a negative value when the operation timing is earlier than the reference timing, and takes a positive value when the operation timing is delayed from the reference timing. For example, evaluation correlated to the timing difference is given to a player.

6-5. Guide Unit

The guide unit 48 is implemented using mainly the control unit 21 and the display unit 27. The guide unit 48 moves a guide image (for example, the timing indicator mark 36) from the generation position (for example, the display position of the generation position mark 34) to the return position and thereafter from the return position toward the generation position, based on the reference timing data in the game screen 30, to thereby indicate a reference timing to a player.

Note here that "moving the timing indicator mark 36 from the return position toward the generation position" refers to moving the timing indicator mark 36 from the return position to the generation position or a position corresponding to the generation position (a position within a predetermined distance from the generation position), and includes, for example, "moving the timing indicator mark 36 so as to return from the return position to the generation position", "after moving the timing indicator mark 36 from the return position, erasing the timing indicator mark 36 once in the game screen 30 before showing again the timing indicator mark 36 near the generation position (a position within a predetermined distance from the generation position) and returning to the generation position (that is, the timing indicator mark 36 is unseen in a predetermined section on a path on which the timing indicator mark 36 moves from the return position to the generation position)", and "moving the timing indicator mark 36 to a predetermined halfway position, rather than returning to the generation position (for example, the timing indicator mark 36 is erased when the timing indicator mark 36 comes closer to the generation position than a predetermined distance away from the generation position")."

In this embodiment, a plurality of generation positions (for example, the display position of the generation position mark 34) are set in the game screen 30, and each of the plurality of generation positions is correlated to any of a plurality of game operations. Data indicating this correlation may be stored in the game data storage unit 42.

Further, in this embodiment, with respect to each of the generation positions (for example, the display position of the generation position mark 34), the guide unit 48 moves the guide image (for example, the timing indicator mark 36) for indicating a reference timing at which to perform a game operation correlated to that generation position from that generation position to a return position that is set based on a line extending from the reference position (for example, the display position of the player image 32) to the generation position or an extended line thereof and thereafter from the return position to the generation position in the game screen 30.

For example, when a reference timing is included in a predetermined period of time subsequent to the current moment (for example, a period of ⅔ bar subsequent to the current moment, which is hereinafter referred to as a guide period), the guide unit 48 generates the timing indicator mark 36 at the position of the generation position mark 34 in the game screen 30, and gradually moves toward the return position in accordance with the difference in the timing between the current moment and the reference timing and further from the return position toward the generation position mark 34, whereby the timing indicator mark 36 reciprocates.

FIG. 14 explains a method for moving the timing indicator mark 36. Below, a case will be described in which a timing with the reference timing data "B" being "1" is coming. That is, a case will be described as an example in which the timing indicator mark 36B is generated at the position of the generation position mark 34B and reciprocates.

As shown in FIG. 14, the generation position Q is set at the display position of the generation position mark 34B. Further, a return position R is set in the game screen 30 so as to satisfy a predetermined positional relationship with the generation position Q. The positional relationship between the generation position Q and the return position R may be determined as desired as long as it is a predetermined positional relationship. Below, a case will be described in which a position apart from the generation position Q by a predetermined distance L in the distance directed from the display position S of the player image 32 toward the generation position Q is set as the return position R.

For example, the timing indicator mark 36B reciprocates on a line segment connecting the generation position Q and the return position R. That is, the timing indicator mark 36B moves on a line extending from the generation position Q to the return position R as a way forward, and thereafter on a line extending from the return position R to the generation position Q as a way backward.

For example, when a timing preceding by ⅔ bar a reference timing with the reference timing data "B" being "1" arrives, the timing indicator mark 36B is generated at the generation position Q. Then, the timing indicator mark 36B moves on the way forward such that the distance l between the display position T of the timing indicator mark 36B and the generation position Q becomes gradually longer. Then, when a timing preceding by ⅓ bar the reference timing with the reference timing data "B" being "1" arrives, the timing indicator mark 36B arrives at the return position R.

When the timing indicator mark 36B arrives at the return position R, the timing indicator mark 36B starts moving on the way backward. That is, the timing indicator mark 36B starts moving on the way backward such that the distance l becomes gradually shorter. Then, when the reference timing with the reference timing data "B" being "1" arrives, the distance l becomes 0, and the timing indicator mark 36B overlaps the generation position mark 34B.

As the reference timing data is defined based on the tempo of music (for example, the reference timing data is defined such that a timing at which the music beats substantially coincides with a reference timing), a timing at which the timing indicator mark 36B returns at the return position R (for example, for n-beat music, a timing preceding a reference timing by k/n bar, in which k and n are positive integers) matches with the tempo of the music. Accordingly, a user can conceive the tempo of music, based on the return movement of the timing indicator mark 36B, and can readily take timing.

Note that the speed of the timing indicator mark 36B may be constant or vary while the timing indicator mark 36B is moving. For example, the speed of the timing indicator mark 36B may be changed depending on a positional relationship between the timing indicator mark 36B and the return position R or the generation position Q. In this case, the speed of the timing indicator mark 36B may be set faster when the timing indicator mark 36B is farther from the generation position Q or the return position R, and slower when the timing indicator mark 36B comes closer to the generation position Q or the return position R.

The manner in which the indicator mark 36B moves is described in the above, which is similarly applicable to movement of other timing indicator mark 36. That is, the display position of the timing indicator mark 36 is adjusted such that the distance l between the timing indicator mark 36 and the generation position mark 34 corresponds to the period of time until a reference timing arrives.

Figure 15:
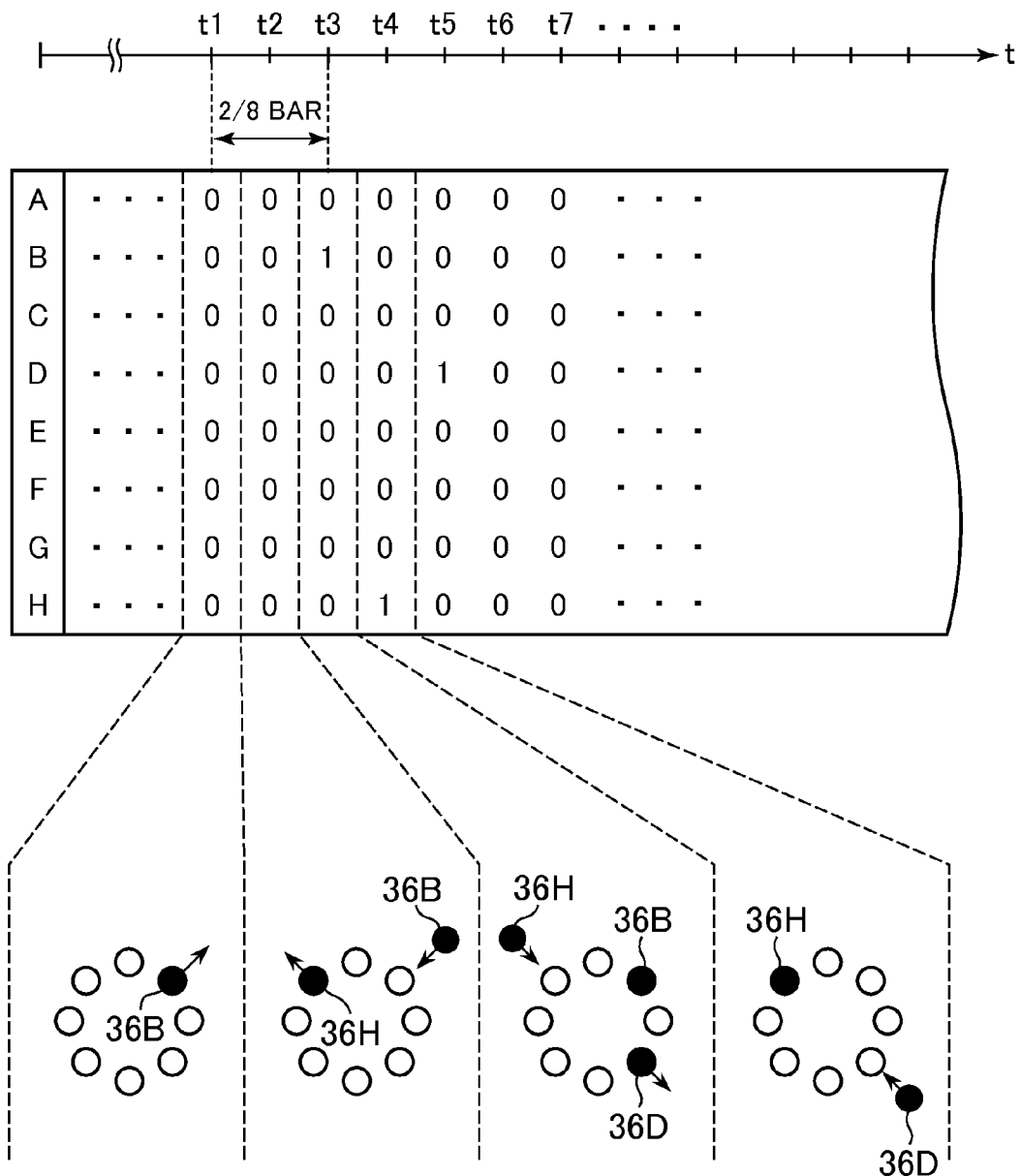
FIG. 15 explains in time series movement of the timing indicator mark.

FIG. 15 explains in series a situation in which the time indicator mark 36 moves. For example, while music is reproduced, data on the guide period (for example, a period from the current moment to a timing subsequent by ⅔ bar) is read from the reference timing data. Then, the timing indicator mark 36 for indicating a reference timing within the guide period is shown in the game screen 30, based on the data read.

As shown in FIG. 15, when the current moment is at the time t1, as data "B" at the time t3 in the guide period (times t1 to t3) indicates "1", the timing indicator mark 36B is generated at the position of the generation position mark 34B.

When the current moment is at the time t2, as data "H" at the time t4 in the guide period (times t2 to t4) indicates "1", the timing indicator mark 36H is generated at the generation position mark 34H. Further, the timing indicator mark 36B generated at the time t1 arrives at the return position, and starts moving on the way backward.

When the current moment is at the time t3, as data "D" at the time t5 in the guide period (times t3 to t5) indicates "1", the timing indicator mark 36D is generated at the generation position mark 34D. Further, as data "B" at the time t3 indicates "1" and a reference timing at which a player should touch the determination area 50B has arrived, the timing indicator mark 36B moving on the way backward arrives at the generation position mark 34B. Note that if a player performs a game operation before the arrival and evaluation is made, the timing indicator mark 36B may be erased. The timing indicator mark 36H arrives at the return position and starts moving on the way backward.

When the current moment is at the time t4, as data "H" at the time t4 indicates "1" and a reference timing at which a player should touch the determination area 50H has arrived, the timing indicator mark 36H moving on the way backward arrives at the generation position mark 34H. Note that if a player performs a game operation before the arrival and evaluation is made, the timing indicator mark 36H may be erased. The timing indicator mark 36D arrives at the return position and starts moving on the way backward.

Similar display control is executed at subsequent points of time. In this manner, the timing indicator mark 36 reciprocates in a radial pattern with the generation position as the start position when a reference timing is coming. This makes it easier for a player to perceive the rhythm of music.

7. Processing Executed in Game Device

Figure 16:
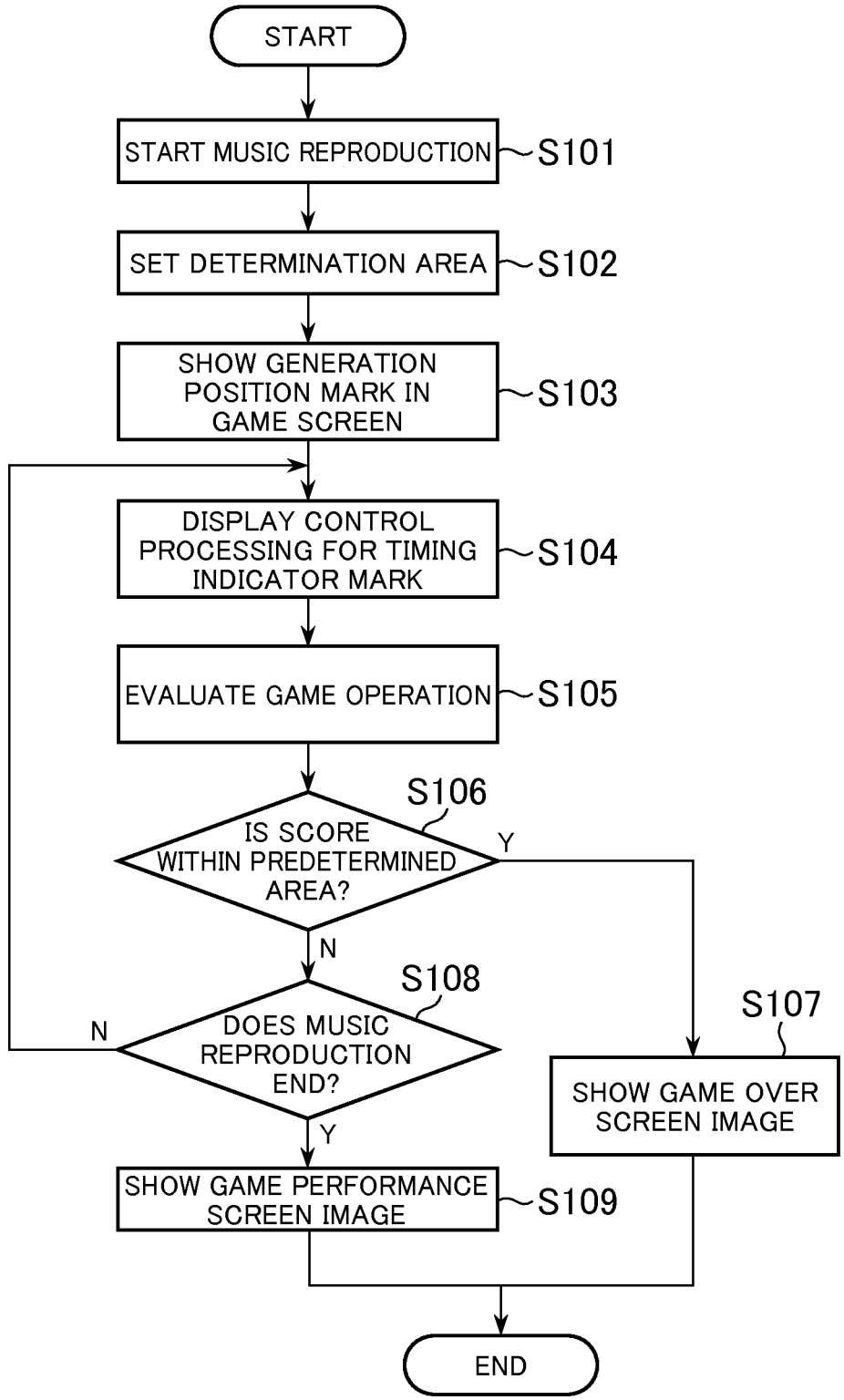
FIG. 16 is a flowchart showing one example of processing executed in a game device.

FIG. 16 is a flowchart showing one example of processing executed in the game device 20. The processing shown in FIG. 16 is executed by the control unit 21 operating according to a program read from an optical disk.

As shown in FIG. 16, initially, the control unit 21 starts reproduction of music (S101). The control unit 21 creates a 3D space in the main storage unit 22, and sets the determination area 50 (S102). The control unit 21 sets a plurality of generation positions in the game screen 30, and shows the generation position mark 34 in the game screen 30 (S103).

Note that at S102, for example, the determination area 50 is set so as to satisfy a predetermined positional relationship with respect to the back P7 of a player indicated by the player position information obtained from the position determination device 1. At S103, a plurality of generation position marks 34 are shown around the player image 32. That is, the positional relationship between the player image 32 and the generation position mark 34 corresponds to that between the back P7 of the player and the determination area 50.

The control unit 21 performs display control processing with respect to the timing indicator mark 36 in the game screen 30, with reference to the reference timing data (S104).

Figure 17:
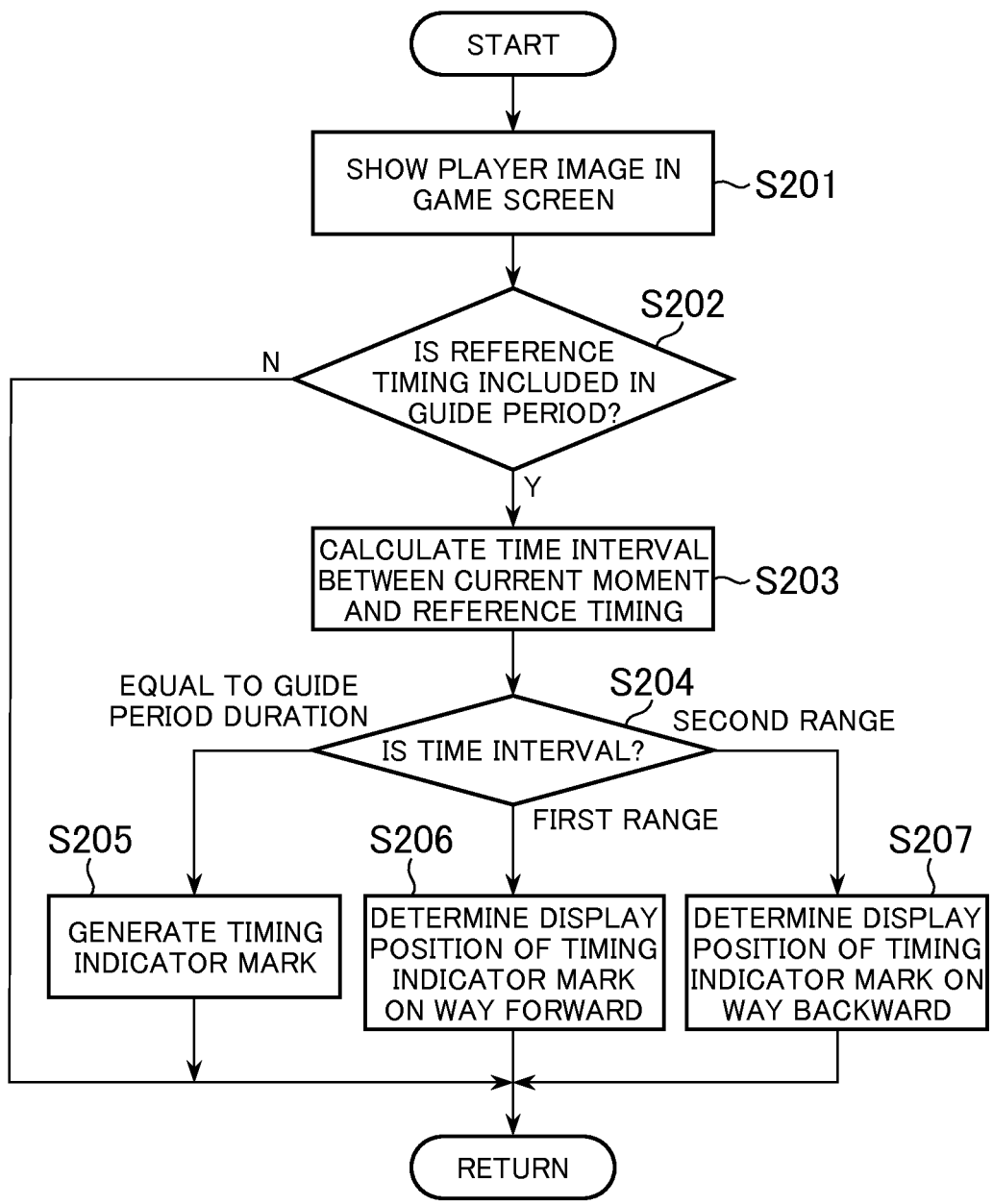
FIG. 17 is a flowchart showing one example of display control processing executed at S104.

FIG. 17 is a flowchart showing one example of the display control processing executed at S104. The processing shown in FIG. 17 is executed, based on a reference timing indicated by each of the data "A" to "H" in the reference timing data. That is, display control processing described below is executed with respect to each of the timing indicator marks 36A to 36H for indicating respective reference timings correlated to the respective generation position marks 34A to 34H. Below, a case will be described in which display control processing is executed with respect to the timing indicator mark 36A, based on the data "A" in the reference timing data.

Initially, as shown in FIG. 17, the control unit 21 shows the player image 32 in the game screen 30, based on a captured image obtained from the position determination device 1 (S201).

With reference to the reference timing data, the control unit 21 determines whether or not a reference timing is included in the guide period (S202). For example, whether or not the data "A" in the reference timing data indicates "1" in a period from the current moment to a timing subsequent to the current moment by ⅔ bar is determined.

When it is not determined that a reference timing is included in the guide period (S202; N), this processing is finished, and the processing is shifted to S105.

Meanwhile, when it is determined that a reference timing is included in the guide period (S202; Y), the control unit 21 calculates the time interval U between the current moment and the reference timing in the guide period (S203). That is, the time interval U between a timing with the data "A" in the reference timing data being "1" and the current moment in the guide period is calculated.

The control unit 21 determines whether the time interval U calculated at S203 is equal to the duration of the guide period (for example, ⅔ bar), within a first range shorter than the duration of the guide period (for example, shorter than ⅔ bar and equal to or longer than ⅛ bar), or within a second range shorter than the first range (for example, shorter than ⅛ bar and equal to or longer than 0 bar) (S204).

When it is determined that the time interval U is equal to the duration of the guide period (S204; the duration of the guide period), the control unit 21 generates the timing indicator mark 36A at the position of the generation position mark 34A (S205). That is, as a reference timing "A" is newly included in the guide period, the timing indicator mark 36A is generated at the position of the generation position mark 34A.

When it is determined that the time interval U is within the first range (S204; the first range), the control unit 21 determines a display position on the timing indicator mark 36A on the way forward such that the time interval U corresponds to the distance 1 (S206). For example, the display position of the timing indicator mark 36A is determined such that a shorter time interval U leads to a longer distance L.

When it is determined that the time interval U is within the second range (S204; the second range), the control unit 21 determines a display position of the control unit 21 on the way backward such that the time interval U corresponds to the distance 1 (S207). For example, the display position of the timing indicator mark 36A is determined such that a smaller difference between the time interval U and the reference timing leads to a shorter distance l.

Note that although display control for the timing indicator mark 36A is described in the above, display control similar to the above described is executed with respect to the timing indicator marks 36B to 36H, based on the reference timing data "B" to "H". That is, "A" in the above description can be read as any of "B" to "H".

Returning to FIG. 16, when display control for the timing indicator mark 36 is executed at S104, the control unit 21 executes evaluation processing for the game operation (S105).

Figure 18:
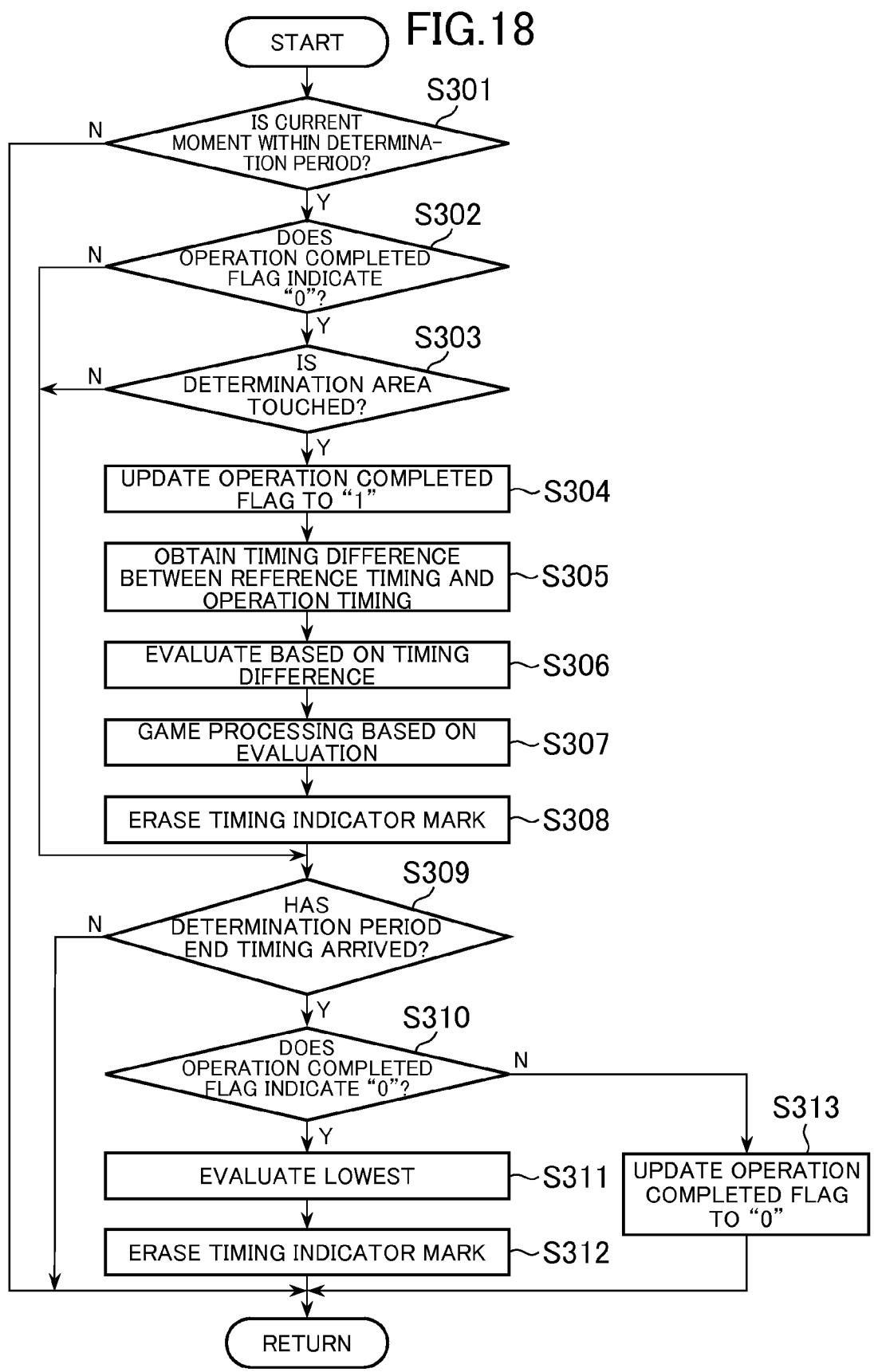
FIG. 18 is a flowchart showing one example of evaluation processing of a game operation.

FIG. 18 is a flowchart showing one example of the evaluation processing for a game operation. The processing shown in FIG. 18 is executed with respect to eight game operations correlated to the respective determination areas 50A to 50H. Below, a case will be described in which a game operation by a player of touching the determination area 50A is performed.

As shown in FIG. 18, initially, the control unit 21 determines whether or not the current moment is within the determination period (S301).

Figure 19:
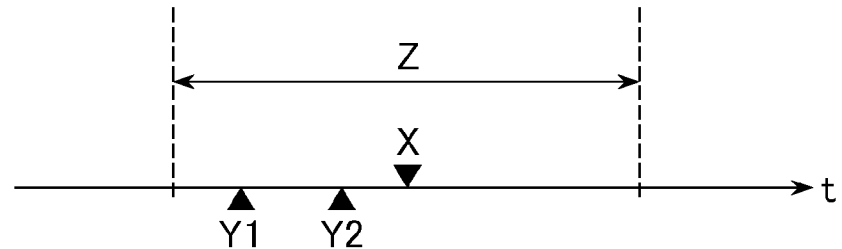
FIG. 19 explains a determination period.

FIG. 19 explains the determination period. In FIG. 19, the t axis represents a time axial. "X" indicates a timing at which to touch the determination area 50A. That is, "X" indicates a reference timing correlated to the determination area 50A, at which the data "A" in the reference timing data indicates "1". "Y1" and "Y2" represent respective timings at which the determination area 50A is touched. That is, "Y1" and "Y2" represent an operation timing.

For example, a determination period is set for each reference timing. In FIG. 19, "Z" represents the determination period. The determination period (Z) is a period including the reference timing (X), a predetermined period of time preceding the reference timing (X), and a predetermined period of time subsequent to the reference timing (X). The determination period (Z) in FIG. 19 is a predetermined period with the reference timing (X) at the midst thereof.

In the determination period (Z), the first operation timing in this period is considered as an evaluation target. For example, in the example shown in FIG. 19, two operation timings (Y1, Y2) are included in the determination period (Z). In this case, the first operation timing (Y1) is compared with the reference timing (X), with the second and thereafter operation timing (Y2) is excluded from comparison targets. This arrangement is employed so that appropriate evaluation is made even when a player repetitively touches the determination area 50A around the reference timing (X).

Returning to FIG. 18, when it is determined that the current moment is not included in the determination period (S301; N), the control unit 21 finishes this processing. That is, the control unit 21 executes the processing at S106 shown in FIG. 16.

Meanwhile, when it is determined that the current moment is included in the determination period (S301; Y), the control unit 21 determines whether or not the operation completed flag indicates "0" (S302). An operation completed flag is stored in the main storage unit 22 or the like, and indicates whether or not the determination area 50A is touched in the current determination period. The operation completed flag takes a value either 0 or 1. "0" means that the determination area 50A is not touched; "1" means that the determination area 50A is touched.

When it is not determined that the operation completed flag indicates "0" (S302; N), the processing is shifted to S309.

Meanwhile, when it is determined that the operation completed flag indicates "0" (S302; Y), the control unit 21 determines whether or not the determination area 50A is touched (S303). This determination is made by determining whether or not the 3D coordinates of each part of a player's body indicated by the player position information are included in the determination area 50A.

When it is not determined that the determination area 50A is touched (S303; N), the processing is shifted to S309. Meanwhile, when it is determined that the determination area 50A is touched (S303; Y), the control unit 21 updates the operation completed flag to "1" (S304).

Then, the control unit 21 obtains the timing difference (ΔT) between the reference timing and the operation timing (S305). The timing difference (ΔT) takes a negative value when the operation timing is earlier than the reference timing, and a positive value when the operation timing is delayed from the reference timing. The operation timing may be a timing at which determination is made at S303 that the determination area 50A is touched or at which the processing at S305 is executed.

The control unit 21 makes evaluation, based on the timing difference (ΔT) obtained at S305 (S306). For example, evaluation is made based on the data shown in FIG. 13. The control unit 21 executes the game processing, based on the evaluation made at S306 (S307), and then erases the timing indicator mark 36 (S308). The game processing executed here includes display effect processing for the game screen 30 and processing for increasing or decreasing the score indicated by the game situation data.

The control unit 21 determines whether or not the end timing of the determination period has arrived (S309). When it is not determined that the end timing of the determination period has arrived (S309; N), the processing is shifted to S106.

Meanwhile, when it is determined that the end timing of the determination period has arrived (S309; Y), the control unit 21 determines whether or not the operation completed flag indicates "0" (S310). The operation completed flag indicating "0" indicates a case in which the determination area 50A is not touched during the determination period.

When it is determined that the operation completed flag indicates "0" (S310; Y), the control unit 21 makes the lowest evaluation (S311), and erases the timing indicator mark 36A (S312). In this case, for example, the score is decreased by a predetermined value. Then, the processing is shifted to S106.

Meanwhile, when it is not determined that the operation completed flag indicates "0" (S310; N), the control unit 21 updates the operation completed flag to "0" (S313). Then, the processing is shifted to S106.

Returning to FIG. 16, the control unit 21 determines whether or not the score is included in a predetermined range (S106). When it is determined that the score is included in the predetermined range (S106; Y), the control unit 21 shows a game over screen image (S107), to thereby finish this processing.

Meanwhile, when it is not determined that the score is included in the predetermined range (S106; N), the control unit 21 determines whether or not music reproduction has ended (S108). When it is not determined that music reproduction has ended (S108; N), the processing returns to S104. Meanwhile, when it is determined that music reproduction has ended (S108; Y), the control unit 21 shows a game performance screen image (S109), and finishes this processing.

In the above described game device 20, when a reference timing at which a player should perform a game operation is coming, the timing indicator mark 36 is generated at the position of the generation position mark 34, and then caused to reciprocate to thereby indicate the reference timing to a player. With the timing indicator mark 36 reciprocating, a player can more readily perceive the rhythm of music, and thus more readily recognize a reference timing.

Further, a plurality of generation position marks 34 are shown in the game screen 30, and the timing indicator mark 36 is shown reciprocating in a radial pattern to thereby indicate a reference timing at which a player should perform a game operation correlated to each of the plurality of generation position marks 34, so that a player can more readily recognize which kind of game operation the player should perform even when there are a plurality of kinds of game operations which the player should perform.

7. Modified Example

The present invention is not limited to the above described embodiment and modified example, and can be appropriately modified without departing from the gist of the present invention.

(1) For example, when many timing indicator marks 36 are shown in the game screen 30, a player may not be able to readily recognize to which generation position mark 34 the timing indicator mark 36 is returning. In view of the above, in a case where the timing indicator mark 36 is generated, the color, size, and the like of the generation position mark 34 to which the timing indicator mark 36 is returning may be changed so that a player can more readily recognize to which timing indicator mark 36 the generation position mark 34 is returning.

The guide unit 48 according to this modified example shows a generation position image (for example, the generation position mark 34) at the generation position in the game screen 30, and changes the generation position image when the guide image (for example, the timing indicator mark 36) starts moving from the generation position to the return position or when the guide image starts moving from the return position toward the generation position. That is, when the timing indicator mark 36 is generated or the timing indicator mark 36 arrives at a return position, the guide unit 48 changes the generation position mark 34.

A case in which the timing indicator mark 36 is generated refers to a case, for example, in which a reference timing is included in the guide period. A case in which the timing indicator mark 36 arrives at a return position refers to a case in which the timing indicator mark 36 returns, and is, for example, a case when it comes to a timing preceding a reference timing by a half of the duration of the guide period and a case in which the time interval U is changed from being included in the first range to being included in the second range.

"Changing the generation position mark 34" refers to changing the manner of displaying the generation position mark 34, and is, for example, at least one of changing the image data itself of the generation position mark 34 to different image data, changing the shape, size, color, or brightness of the generation position mark 34, and blinking the generation position mark 34.

Figure 20:
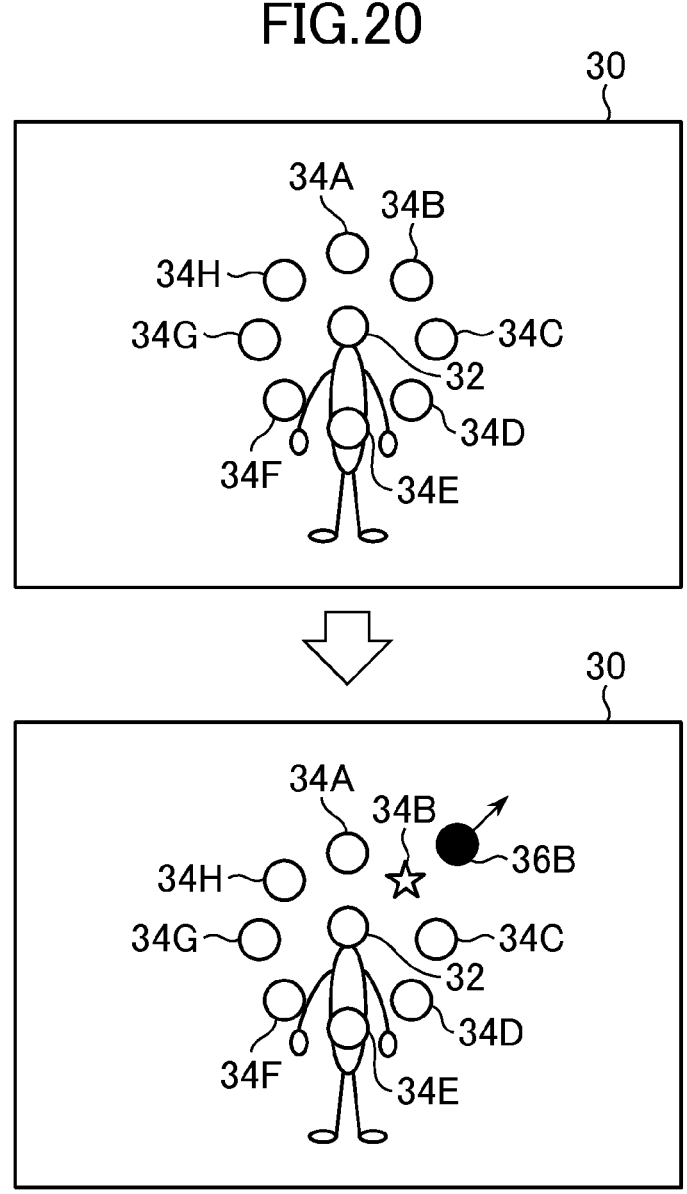
FIG. 20 shows a game screen shown in a modified example (1)

FIG. 20 shows the game screen 30 shown in a modified example (1) As shown in FIG. 20, when no reference timing is included in the guide period, as no timing indicator mark 36 is shown in the game screen 30, the generation position mark 34 is not changed. Meanwhile, when a reference timing is included in the guide period, for example, that is, when the timing indicator mark 36 is generated and starts moving on the way forward, the generation position mark 34 is changed.

In the example shown in FIG. 20, as the reference timing data "B" in the guide period indicates "1", the timing indicator mark 36B is generated at the position of the generation position mark 34B. Then, the generation position mark 34B is changed from a round image to a star image. When the timing indicator mark 36B reciprocates to return to the generation position mark 34B (that is, when the reference timing arrives), the generation position mark 34 restores its original image. That is, the generation position mark 34B is changed from the star image to the round image.

Note that although a case in which the generation position mark 34 is changed when the timing indicator mark 36 is generated is described with reference to FIG. 20, the generation position mark 34 may be changed when the timing indicator mark 36 arrives at the return position, as described above. That is, the generation position mark 34 may be changed when the timing indicator mark 36 has completed its movement on the way forward and starts returning.

According to the modified example (1), changing the generation position mark 34 makes it easier for a player to recognize to which generation position mark 34 the timing indicator mark 36 is returning. As a result, the player can readily know which determination area 50 to touch.

(2) Further, for example, when a plurality of timing indicator marks 36 are shown in the game screen 30, it may not be easy to recognize on which of the way forward and the way backward the timing indicator mark 36 is moving. In view of the above, the timing indicator mark 36 may be changed between when moving on the way forward and when moving on the way backward.

The guide unit 48 in the modified example (2) changes the guide image between when the guide image (for example, the timing indicator mark 36) is moving from the generation position to the return position and when the guide image is moving from the return position toward the generation position. That is, the guide unit 48 makes the timing indicator mark 36 different between when moving on the way forward and when moving on the way backward.

"Changing the timing indicator mark 36" refers to changing the manner of displaying the timing indicator mark 36, similar to the generation position mark 34, and is, for example, at least one of changing the image data itself of the timing indicator mark 36 to different image data, changing the shape, size, color, and brightness of the timing indicator mark 36, and blinking the timing indicator mark 36.

For example, as the timing indicator mark 36 is moving on the way forward when the time interval U is included in the first range, the timing indicator mark 36 takes the first display format (for example, a round shape). Meanwhile, as the timing indicator mark 36 is moving on the way backward when the time interval U is included in the second range, the timing indicator mark 36 takes the second display format different from the first display format (for example, a star shape).

Figure 21:
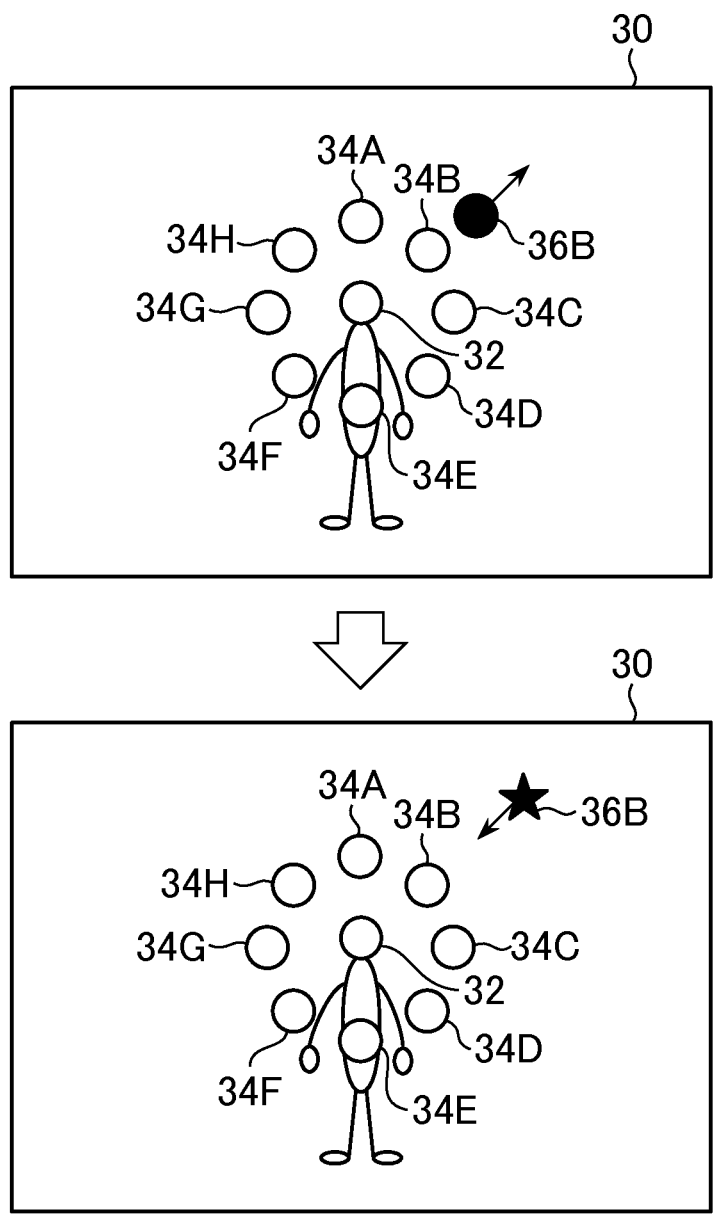
FIG. 21 shows a game screen shown in a modified example (2)

FIG. 21 shows the game screen 30 shown in the modified example (2). As shown in FIG. 21, when the timing indicator mark 36 is moving on the way forward, the timing indicator mark 36 is shown as a round image. Meanwhile, when the timing indicator mark 36 arrives at the return position and starts moving on the way backward, the timing indicator mark 36 is changed into a star image and moves on the way backward.

According to the modified example (2), as the timing indicator mark 36 is changed between when moving on the way forward and when moving on the way backward, a player can more readily recognize on which of the way forward and the way backward the timing indicator mark 36 is moving. This resultantly makes it easier for a player to recognize a reference timing.

(3) Further, for example, when a plurality of timing indicator marks 36 are moving from a certain generation position mark 34, the timing indicator marks 36 may overlap with one another and thus become hardly recognizable. In view of the above, moving paths for the plurality of timing indicator marks 36 may be displaced from each other to thereby prevent the timing indicator marks 36 from overlapping with each other.

Figure 22:
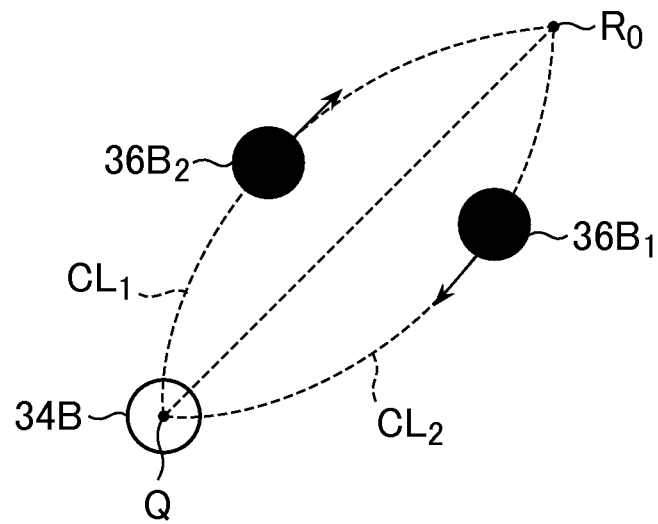
FIG. 22 shows a movement path for a timing indicator mark in a modified example (3-1)

(3-1) FIG. 22 shows a moving path for the timing indicator mark 36B in the modified example (3-1). For example, a case will be described in which two reference timings with the reference timing data "B" indicating "1" are included in the guide period. Of these two standard timings, the earlier one is referred to as a first reference timing, and the latter one is referred to as a second reference timing.

In this case, the guide unit 48 moves the first guide image (for example, the timing indicator mark $36B_1$) from the generation position Q to the return position $R_0$ and thereafter from the return position $R_0$ toward the generation position Q, to thereby indicate the first reference timing to a player. Further, the guide unit 48 moves the second guide image (for example, the timing indicator mark $36B_2$) from the generation position Q to the return position $R_0$, and thereafter from the return position $R_0$ to the generation position Q, to thereby indicate the second reference timing, which comes after the first reference timing, to the player.

Further, in a case where the second guide image (for example, the timing indicator mark $36B_2$) is moving from the generation position Q to the return position $R_0$ while the first guide image (for example, the timing indicator mark $36B_1$) is moving from the return position $R_0$ to the generation position Q, the guide unit 48 sets different the path on which the first guide image moves from the return position $R_0$ to the generation position Q and the path on which the second guide image moves from the generation position Q to the return position $R_0$.

For example, as shown in FIG. 22, in the game screen 30, when the timing indicator mark $36B_1$ is moving on the way backward and the timing indicator mark $36B_2$ is moving on the way forward, the respective paths are set at different positions. For example, a first curved line $CL_1$ connecting the generation position Q and the return position $R_0$ is defined as the way forward, while a second curved line $CL_2$ different from the first curved line $CL_1$ is defined as the way backward. Data indicating the first curved line $CL_1$ and the second curved line $CL_2$ may be stored in advance in the game data storage unit 42.

According to the modified example (3-1), it is possible to prevent the timing indicator marks 36 from overlapping with each other and thus becoming hardly recognizable.

(3-2) Note that a method for displacing the paths for the timing indicator mark $36B_1$ and for the timing indicator mark $36B_2$ is not limited to the above described example. Alternatively, for example, the return position for the timing indicator mark $36B_1$ may be displaced from the return position for the timing indicator mark $36B_2$, whereby the way backward for the timing indicator mark $36B_1$ and the way forward for the timing indicator mark $36B_2$ are defined displaced from each other.

Figure 23:
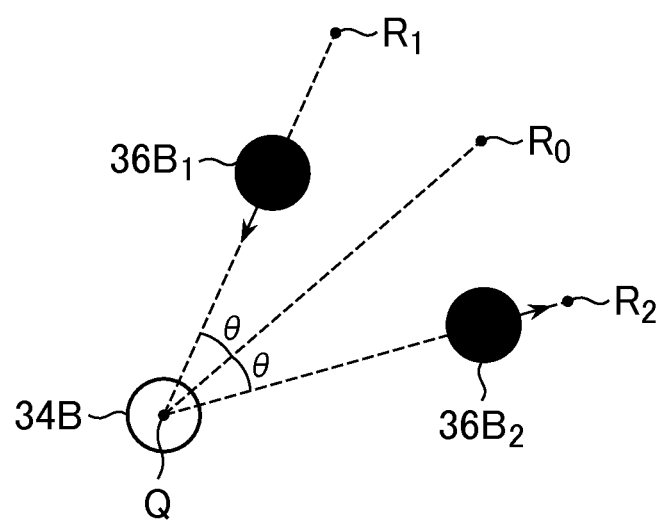
FIG. 23 shows a determination method for determining a movement path for a timing indicator mark in a modified example (3-2)

FIG. 23 shows a method for determining a movement path for the timing indicator mark 36 in the modified example (3-2). As shown in FIG. 23, the return position $R_1$ for the timing indicator mark $36B_1$ is defined different from the return position $R_2$ for the timing indicator mark $36B_2$, whereby the way forward and the way backward for the timing indicator mark $36B_1$ and the way forward and the way backward for the timing indicator mark $36B_2$ are displaced from each other.

For example, a position rotated counter-clockwise from the original return position $R_0$ by an angle θ with the generation position Q as a reference is defined as the return position R. Further, for example, a position rotated clockwise from the initial return position $R_0$ by the angle θ with the generation position Q as a reference is defined as the return position $R_2$.

The guide unit 48 in the modified example (3-2) moves the first guide image (for example, the timing indicator mark $36B_1$) from the generation position Q to the first return position $R_1$, and thereafter from the first return position $R_1$ toward the generation position Q, to thereby indicate the first reference timing to a player.

Further, in order to indicate to a player the second reference timing that arrives later than the first reference timing while the first guide image (for example, the timing indicator mark $36B_1$) is shown in the game screen 30, the guide unit 48 moves the second guide image (for example, the timing indicator mark $36B_2$) from the generation position Q to a second return position $R_2$ different from the first return position $R_1$, and thereafter from the second return position $R_2$ toward the generation position Q, to thereby indicate the second reference timing to the player.

According to the modified example (3-2), it is possible to prevent the timing indicator marks 36 from overlapping with each other and thus becoming hardly recognizable.

(3-3) Note that the modified example (3-1) may be combined with the modified example (3-2). For example, data indicating a movement path for the timing indicator mark 36 may be correlated to each reference timing indicated by the reference timing data.

Figure 24:
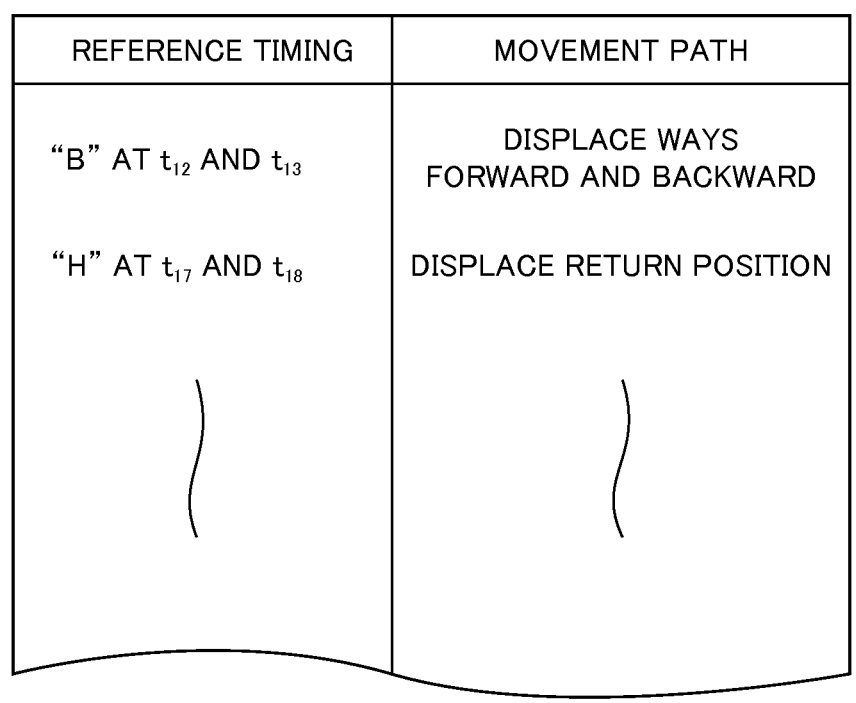
FIG. 24 shows a correlation between a reference timing and a movement path of a timing indicator mark for indicating the reference timing.

FIG. 24 shows a correlation between a reference timing and a movement path for the timing indicator mark 36 for indicating a reference timing. Data indicating the correlation may be stored in the game data storage unit 42. As a movement path, for example, information indicating either of a path including different way forward and way backward, as shown in the modified example (3-1), and a path including a return position changed, as shown in the modified example (3-2), is stored.

When a plurality of reference timings are included in the guide period, the guide unit 48 moves the timing indicator mark 36 for indicating each of the plurality of reference timings, based on the movement path correlated to that reference timing.

According to the modified example (3-3), it is possible to set a movement path for the timing indicator mark 36 when a plurality of reference timings are included in the guide period.

(4) Further, for example, an image other than the timing indicator mark 36 may move on the way forward and the way backward for the timing indicator mark 36. In this case, as a player plays a game without being bothered by the image, it is possible to enhance amusement of the game.

FIG. 25 shows one example of the game screen 30 in the modified example (4). As shown in FIG. 25, for example, an obstacle mark 38B is shown on the path for the timing indicator mark 36B. The obstacle mark 38B does not either indicate a reference timing or move based on the interval between the current moment and a reference timing.

The game device 20 in the modified example (4) includes means for moving a predetermined image (for example, the obstacle mark 38B) on a line extending from the generation position to the return position and an extended line thereof without return at the return position in the game screen 30. This means is implemented by the game execution unit 44, for example. The obstacle mark 38B moves on the way forward for the timing indicator mark 36B to the return position, and thereafter moves further without return. That is, as shown in FIG. 25, the obstacle mark 38B may move in the game screen 30 in the movement direction on the way forward until being erased from the game screen 30.

The obstacle mark 38B may have a shape same as or different from that of the timing indicator mark 36B. For example, the obstacle mark 38B may be an image same in the shape as but different in the color from those of the timing indicator mark 36B. The obstacle mark 38B may move at a speed same as or different from that of the timing indicator mark 36B.

According to the modified example (4), showing the obstacle mark 38B in the game screen 30 can enhance excitement of the game.

(5) Further, for example, it may be arranged such that the movement distance of the timing indicator mark 36 for indicating a subsequent reference timing is changed in accordance with the amount of operation performed when a reference timing arrives, to thereby enhance excitement of the game. For example, the movement distance of the timing indicator mark 36 for indicating the next reference timing may be changed in accordance with the speed of a part of a player's body when the player touches the determination area 50.

The game operation detection unit 40 in the modified example (5) includes means for determining the amount of operation of a game operation. Note that the amount of change of a part of a player's body corresponds to the "amount of operation".

The guide unit 48 includes means for determining, when a game operation is evaluated, the distance between the generation position and the return position, based on the amount of operation of the game operation. The guide unit 48 moves the guide image (for example, the timing indicator mark 36) for indicating a reference timing that comes after the game operation is performed from the generation position to a return position that is apart by the determined distance, and thereafter from the return position toward the generation position. In the above, the distance between the generation position and the return position is determined, based on a change of the player position information.

Figures 26, 27:
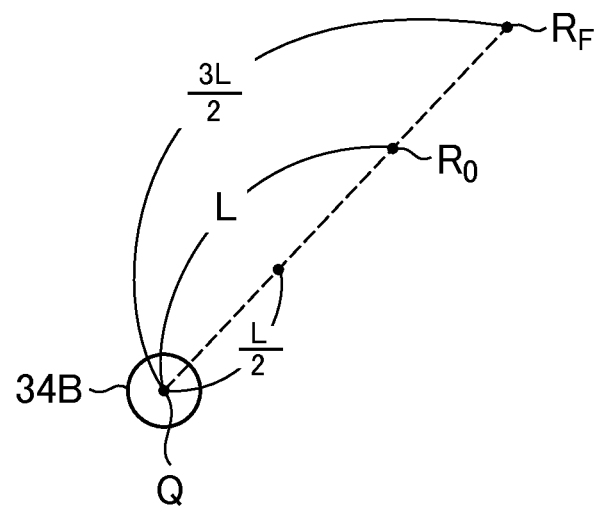
FIG. 26 shows a correlation between change of the player position information and the distance between a generation position and a return position.
FIG. 27 shows a return position in accordance with change of the player position information.

FIG. 26 shows a correlation between a change of the player position information and the distance between the generation position and the return position. Data indicating the correlation is stored in the game data storage unit 42, for example. As shown in FIG. 26, for example, the amount of change (or a speed) of each part of a player's body indicated by the player position information is correlated to information indicating the distance.

As the amount of change of each part of a player's body indicated by the player position information, information indicating the amount of change in the position of any of the parts of a player in a predetermined period, that is, information concerning the speed of apart of a player's body, is stored. Below, a case will be described in which three kinds of information items, namely, "small", "normal", and "large", in accordance with the amount of change of the player position information are stored. For example, the amount of change of a part of a player's body is compared with a threshold to determine to which of the above described information items the change in the position of the part of the player's body belongs.

As the information indicating the distance between the generation position and the return position, for example, information indicating at which position apart from the generation position by how long in which direction a return position is set is stored. Below, a case will be described in which three kinds of information items, namely, "near", "normal", "far", relative to the generation position are stored as information indicating the distance. For example, information concerning the distance L between the generation position and the return position is stored.

When a game operation is evaluated, the guide unit 48 specifies the amount of change of a part corresponding to the game operation, with reference to a change in time series of the player position information stored in the game data storage unit 42. Then, the guide unit 48 determines the return position, based on the distance correlated to the specified amount of change.

FIG. 27 shows a return position in accordance with a change of the player position information. Below, a case will be described as an example in which a player performs a game operation of touching the determination area 50B with a right hand when a reference timing with the reference timing data "B" indicating "1" arrives. Initially, the amount of change of the lower right arm P6 of the player when the player touches the determination area 50B is obtained, based on a change in time series in the 3D coordinates of the lower right arm P6 of the player.

When the amount of change of the lower right arm P6 of the player is "small", a return position $R_N$ is defined at a position apart from the generation position Q (the display position of the generation position mark 34B) by the distance L/2, as shown in FIG. 27. When the amount of change of the lower right arm P6 of the player is "normal", a return position $R_0$ is defined at a position apart from the generation position Q (the display position of the generation position mark 34B) by the distance L, as shown in FIG. 27. When the amount of change of the lower right arm P6 of the player is "large", a return position $R_F$ is defined at a position apart from the generation position Q (the display position of the generation position mark 34B) by the distance 3 L/2, as shown in FIG. 27.

Then, the timing indicator mark 36B for indicating a reference timing that arrives after the return position is defined as described above moves toward the return position defined as described above. The return position is defined again in accordance with a game operation performed at the reference timing.

According to the modified example (5), as it is possible to change the movement distance of the timing indicator mark 36 for indicating the next reference timing in accordance with a change in the position of a part of a player's body at the reference timing, it is possible to enhance excitement of the game.

Note that in this embodiment a case is described in which a game operation is detected, based on the player position information, it may be arranged such that pressing each button provided to the controller of the operation unit 26 may correspond to a "game operation". In this case, a return position may be determined in accordance with the strength with which a player presses the button of the operation unit 26. For example, the more strongly a player presses the operation unit 26, the farther position from the generation position the return position may be set at.

In this case, the game operation detection unit 40 detects a game operation by a player, based on a determination signal from an operation means (for example, the operation unit 26) including an operation detection unit for detecting an operation by a player and a pressure determination unit for determining a pressure applied to the detection unit. For example, a button of the operation unit 26 corresponds to the operation detection unit. For example, the operation unit 26 includes a button which a player can press. The game operation detection unit 40 obtains a determination signal due to the button from the operation unit 26 to determine whether or not a game operation has been performed.

Further, for example, the operation unit 26 may include a pressure sensor for determining a pressure with which the button is pressed. The pressure sensor corresponds to the pressure determination unit. The game operation detection unit 40 obtains a determination signal by the pressure sensor from the operation unit 26 to determine a pressure applied to the button.

In this case as well, as a correlation between a pressure applied to the button of the operation unit 26 and the distance between the generation position and the return position is stored so that the movement distance of the timing indicator mark 36 can be changed, it is possible to enhance excitement of the game.

Further, it may be arranged such that touching the operation unit 26 corresponds to a "game operation". In this case, the operation unit 26 has a pressure sensor incorporated in the touch panel, for determining a pressure applied in touching. The movement direction of the timing indicator mark 36 may be changed in accordance with the pressure with which a player touches the touch panel. Alternatively, the pressure may be determined, based on the touch area on a touch panel, for example.

Further, the "amount of operation" of a game operation is not limited to the above described speed or pressure of a player's body part. Alternatively, the "amount of operation" may correspond to, for example, the number of timings at which a part of a player's body enters the determination area 50 or the button of the controller is pressed.

(6) Further, for example, the generation position and the return position of the timing indicator mark 36 may be changed when a game operation is performed when the timing indicator mark 36 arrives at the return position, to thereby enhance excitement of the game.

The guide unit 48 in the modified example (6) includes means for determining whether or not a game operation is performed when the guide image (for example, the timing indicator mark 36) arrives at the return position. A case in which the timing indicator mark 36 arrives at the return position refers to a case in which the timing indicator mark 36 starts moving on the way backward after returning from the way forward.

For example, the guide unit 48 compares a timing at which the timing indicator mark 36 arrives at the return position (for example, a timing preceding a reference timing by ⅛ bar) and an operation timing to obtain a timing difference. When the timing difference is within a predetermined range, it is determined that a game operation is performed when the timing indicator mark 36 arrives at the return position.

Further, the guide unit 48 includes means for changing the generation position, based on the return position, and changing the return position, based on the changed generation position, when it is determined that a game operation is performed when the guide image (for example, the timing indicator mark 36) arrives at the return position, and moves the guide image for indicating a reference timing that comes after the game operation is performed, from the changed generation position to the changed return position, and thereafter from the changed return position toward the changed generation position.

FIG. 28 shows the generation position being changed. For example, in a case where the determination area 50B is touched when the timing indicator mark 36B arrives at the return position, the guide unit 48 changes the generation position mark 34B so as to be shown at the return position. Following the change in the position of the generation position mark 34B, the return position is also changed. For example, a position apart from the changed generation position mark 34B by the distance L is defined as the return position.

According to the modified example (6), the generation position is changed when a game operation is performed when the timing indicator mark 36 arrives at the return position. This can enhance excitement of the game.

Further, a method for changing the generation position is not limited to the above described example. Any method is applicable as long as the generation position is changed to a position different from the generation position before a game operation is performed when the timing indicator mark 36 arrives at the return position. The return position may be determined at a position in accordance with a change of the generation position.

(7) Further, for example, whereas the determination area 50B correlated to the generation position mark 34B is defined at a position which a player can readily touch, the determination area 50A correlated to the generation position mark 34A is defined at a position above the player, that is, a position which a player can relatively hardly touch. In view of the above, the data "A" in the reference timing data may be replaced by the data "B" as the game progresses to thereby adjust difficulty of the game.

For example, in a case where the reference timing data is defined such that not many reference timings at which to touch the determination area 50A are set but reference timings at which to touch the determination area 50B are successively set, exchanging these reference timings imposes a player to successively touch the determination area 50A above his/her head. For example, in a case where the score of a player is relatively increasing, which means relatively low possibility of game over, difficulty of the game may be increased in the above described manner.

The game device 20 in the modified example (7) further includes means for replacing first reference timing data (for example, data "A") by second reference timing data (for example, data "B"). For example, the data "A" in the reference timing data is exchanged with data "B" in the reference timing data.

FIG. 29 shows a correlation between a condition on a situation of an ongoing game and a method for replacing a reference timing. Data showing the correlation shown in FIG. 29 is stored in the game data storage unit 42, for example.

A condition on a situation of a game refers to information on the range of a value which the game situation data can take, and, for example, the range of a score indicated by the game situation data is stored. Alternatively, a condition may concern whether or not music has already been played for a period of time that is within a predetermined range, or the like. As a method for replacing the reference timing, information concerning which reference timing data is replaced by which reference timing data is stored.

For example, whether or not the condition shown in FIG. 29 is satisfied is determined with reference to the game situation data. When the condition is satisfied, the reference timing is replaced according to the replacement method correlated to the condition. In the example of data stored shown in FIG. 29, when the score indicated by the game situation data comes to be included in a predetermined range, the data "A" in the reference timing data is exchanged by "B".

Figure 30:
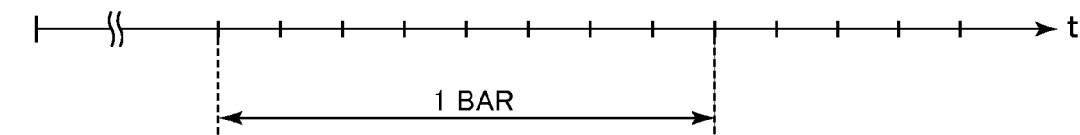
FIG. 30 shows an example of data stored when the reference timing data is replaced.

FIG. 30 shows an example of the data stored when the reference timing data is replaced. In the example of the data stored shown in FIG. 30, for example, before the reference timing is changed, the data "A" indicates "0" at relatively many timings and "1" at few timings. Further, before the reference timing is changed, the data "B" indicates "1" at relatively many timings and "0" at few timings. With the reference timing set as described above, there are fewer occasions in which a player touches the determination area 50A which can be relatively hardly touched, and many occasions in which the player touches the determination area 50B which can be relatively readily touched. This results in relatively low difficulty of game.

Meanwhile, when the data "A" and "B" in the reference timing data are exchanged, as shown in FIG. 30, the data "A" indicates "1" at relatively many timings and "0" at few timings and the data "B" indicates "0" at relatively many timings and "1" at few timings. With the reference timing set as described above, occasions in which a player touches the determination area 50A which can be relatively hardly touched increases, while occasions in which the player touches the determination area 50B which can be relatively readily touched decreases. This results in higher difficulty of a game, compared to that before the exchange.

When the first reference timing data (for example, the data "A") is replaced by the second reference timing data (for example, the data "B"), the guide unit 48 in the modified example (7) moves a predetermined image from the second generation position (for example, the position of the generation position mark 34B) to the first generation position (for example, the position of the generation position mark 34A) in the game screen 30, to thereby indicate the replacement of the first reference timing data by the second reference timing data to a player.

FIG. 31 shows shifting of the game screen 30 when the reference timing data is exchanged. As shown in FIG. 31, when the data "A" and "B" in the reference timing data are exchanged, display control processing is executed such that the generation position marks 34A and 34B are executed. Then, the timing indicator mark 36A is successively generated above the head of the player image 32. In this case, a player is to touch the determination area 50A, following the timing indicator mark 36A moving.

According to the modified example (7), it is possible to adjust difficulty of a game while the game is ongoing.

Note that although a case in which the data "A" and "B" in the reference timing data are exchanged is described in the above, the exchange method is not limited to the above described example, and any method is applicable as long as one reference timing data is replaced by another reference timing data. Thus, alternatively, for example, the reference timing data may be changed as if the generation position mark 34 was rotated clockwise such that, for example, the data "A" in the reference timing data is replaced by "B", "B" by "C", "C" by "D", and the like.

(8) Further, for example, although a case is described in the embodiment and the modified examples in which the generation position is set around the player image 32, the generation position set in the game screen 30 is not limited to the described above. Alternatively, the generation positions may be arranged in a fan shape with the player image 32 as a reference, or in linear. Still alternatively, there is only one generation position set.

(9) Further, for example, although a player's moving his/her body so as to touch the determination area 50 or a player's operating the operation unit 26 is described as an example of a game operation in the embodiment and the modified examples, various kinds of operations are applicable as a game operation. For example, a player's moving his/her body such that the player shown as the player image 32 touches the generation position mark 34 may correspond to a game operation.

(10) Further, for example, although a case is described in the above in which the position determination device 1 has a means for generating the player position information, based on a captured image and the depth information (depth image), the means for generating the player position information may be included in the game device 20. For example, the game device 20 may receive a captured image and a depth image from the position determination device 1, and generate the player position information based on these images.

(11) Although a case in which the game device 20 executes a dance game is described in the above described embodiment and modified examples, the game device 20 may execute a game in which a player performs a game operation to the music.

The invention claimed is:

1. A game device for executing a game in which a player performs a game operation to music, comprising:
   a reference timing data obtaining unit, for obtaining reference timing data from a storage unit which stores reference timing data indicating a reference timing at which the player should perform the game operation;
   a guide unit for indicating the reference timing to the player by moving a guide image in a game screen from a generation position to a return position and thereafter moving the guide image from the return position toward the generation position prior to when the player should perform the game operation, based on the reference timing data;
   a game operation detector for detecting the game operation by the player, wherein the game operation detector comprises a camera that captures an image of the player at predetermined time intervals, wherein the captured images of the player are used to determine the player s position information, and wherein the detection of the game operation by the player is based in part on the player s determined position information; and
   an evaluator for evaluating the game operation by the player, based on an operation timing at which the player performs the game operation and the reference timing indicated by the reference timing data.

2. The game device according to claim 1, wherein the guide unit indicates the reference timing to the player by moving the game image in the game screen from the generation position to the return position and thereafter moving the guide image from the return position to the generation position.

3. The game device according to claim 1, wherein the guide unit shows a generation position image at the generation position in the game screen, and changes the generation position image in a case where the guide image starts moving from the generation position to the return position or in a case where the guide image starts moving from the return position toward the generation position.

4. The game device according to claim 1, wherein the guide unit changes the guide image between in a case where the guide image moves from the generation position to the return position and in a case where the guide image moves from the return position toward the generation position.

5. The game device according to claim 1, wherein the guide unit comprises:
   a first reference timing indicator for indicating a first reference timing to the player by moving a first guide image from the generation position to the return position and thereafter moving the first guide image from the return position toward the generation position, and
   a second reference timing indicator for indicating a second reference timing that comes later than the first reference timing to the player by moving a second guide image from the generation position to the return position and thereafter moving the second guide image from the return position toward the generation position, and
   sets different a path on which the first guide image moves from the return position to the generation position and a path on which the second guide image moves from the generation position toward the return position in a case where the second guide image moves from the generation position toward the return position while the first guide image is moving from the return position toward the generation position.

6. The game device according to claim 1, wherein the guide unit comprises:
   a first reference timing indicator for indicating a first reference timing to the player by moving a first guide image from the generation position to a first return position and thereafter moving the first guide image from the first return position toward the generation position, and
   a second reference timing indicator for indicating a second reference timing that comes later than the first reference timing to the player, in a case where indicating the second reference timing to the player while the first guide image is shown in the game screen, by moving a second guide image from the generation position to a second return position different from the first return position, and thereafter moving the second guide image from the second return position toward the generation position.

7. The game device according to claim 1, wherein the game device further comprises:
   a moving unit for moving in the game screen an image on a line extending from the generation position to the return position and an extended line thereof without return at the return position.

8. The game device according to claim 1, wherein
   the game operation detector includes a first determiner for determining an amount of operation of the game operation, and
   the guide unit includes a second determiner for determining a distance between the generation position and the return position, based on the amount of operation of the game operation, in a case where the game operation is evaluated, and moves the guide image for indicating the reference timing that comes after the game operation is performed from the generation position to the return position that is away by the distance determined and thereafter moving the guide image from the return position toward the generation position.

9. The game device according to claim 1, wherein the guide unit comprises:
- a determiner for determining, whether or not the game operation is performed, in a case where the guide image arrives at the return position, and
- a changing unit for changing, the generation position, based on the return position, and then changing the return position, based on the generation position changed, in the case where it is determined that the game operation is performed, in a case where the guide image arrives at the return position, and wherein the changing unit moves the guide image for indicating the reference timing that comes after the game operation is performed, from the generation position changed to the return position changed, and thereafter moves the guide image from the return position changed to the generation position changed.

10. The game device according to claim 1, wherein
the game operation detector detects a plurality of kinds of game operations,
the reference timing data indicates a reference timing at which to perform each of the plurality of kinds of game operations,
a plurality of generation positions are set in the game screen,
each of the plurality of generation positions is correlated to any of the plurality of kinds of game operations, and
the guide unit moves, with respect to each of the plurality of generation positions, the guide image for indicating a reference timing at which to perform the game operation correlated to that generation position, from the generation position to the return position that is set, based on a line extending from the reference position to the generation position or an extended line thereof in the game screen, and thereafter moves the guide image from the return position toward the generation position.

11. The game device according to claim 1, wherein
the game operation detector detects a first kind of game operation and a second kind of game operation,
the reference timing data includes first reference timing data indicating a first reference timing at which to perform the first kind of game operation and second reference timing data indicating a second reference timing at which to perform the second kind of game operation,
the guide unit comprises:
- a first reference timing indicator for indicating the first reference timing to the player by moving a first guide image from a first generation position to a first return position and thereafter moving the first guide image from the first return position toward the first generation position, and
- a second reference timing indicator for indicating the second reference timing to the player by moving a second guide image from a second generation position to a second return position, and thereafter moving the second guide image from the second return position toward the second generation position, the game device further comprises a replacing unit for replacing the first reference timing data by the second reference timing data while the game is being executed, and
in a case where the first reference timing data is replaced by the second reference timing data, the guide unit indicates replacement of the first reference timing data by the second reference timing data to the game player by moving an image from the second generation position to the first generation position in the game screen.

12. A control method for a game device for executing a game in which a player performs a game operation to music, comprising:
- obtaining reference timing data from a storage unit which stores reference timing data indicating a reference timing at which the player should perform the game operation;
- indicating the reference timing to the player by moving a guide image in a game screen from a generation position to a return position and thereafter moving the guide image from the return position toward the generation position prior to when the player should perform the game operation, based on the reference timing data;
- detecting the game operation by the player, wherein the game operation detection is based on a camera that captures an image of the layer at predetermined time intervals, wherein the ensured images of the player are used to determine the player s position information, and wherein the detecting of the game operation by the player is based in part on the player s determined position information; and
- evaluating the game operation by the player, based on an operation timing at which the player performs the game operation and the reference timing indicated by the reference timing data.

13. A non-transitory computer readable medium storing a program for causing a computer to function as a game device for executing a game in which a player performs a game operation to music, the program further causing the computer to:
- obtain reference timing data from a storage which stores reference timing data indicating a reference timing at which the player should perform the game operation;
- indicate the reference timing to the player by moving a guide image in a game screen from a generation position to a return position and thereafter moving the guide image from the return position toward the generation position prior to when the player should perform the game operation, based on the reference timing data;
- detect the game operation by the player, wherein the game operation is detected based on a camera that captures an image of the player at predetermined time intervals, wherein the captured images of the player are used to determine the player s position information, and wherein the detected game operation by the player is based in part on the player s determined position information; and
- evaluate the game operation by the player, based on an operation timing at which the player performs the game operation and the reference timing indicated by the reference timing data.

14. A game device for executing a game in which a player performs a game operation to music, comprising:
- means for obtaining reference timing data from a storage which stores reference timing data indicating a reference timing at which the player should perform the game operation;
- guide means for indicating the reference timing to the player by moving a guide image in a game screen from a generation position to a return position and thereafter moving the guide image from the return position toward the generation position prior to when the player should perform the game operation, based on the reference timing data;
- game operation detection means for detecting the game operation by the player, wherein the game operation detection means captures an image of the player at predetermined time intervals, wherein the captured images of the player are used to determine the player s position information, and wherein the detection of the game operation by the player is based in part on the player s determined position information; and evaluation means for evaluating the game operation by the player, based on an operation timing at which the player performs the game operation and the reference timing indicated by the reference timing data.

15. A game device for executing a game in which a player performs a game operation to music, the game device comprising at least one microprocessor configured to:

obtain reference timing data from a storage which stores reference timing data indicating a reference timing at which the player should perform the game operation;

indicate the reference timing to the player by moving a guide image in a game screen from a generation position to a return position and thereafter moving the guide image from the return position toward the generation position prior to when the player should perform the game operation, based on the reference timing data;

detect the game operation by the player, wherein the game operation is detected based on a camera that captures an image of the player at predetermined time intervals, wherein the captured images of the player are used to determine the player s position information, and wherein the detected game operation by the player is based in part on the player s determined position information; and evaluate the game operation by the player, based on an operation timing at which the player performs the game operation and the reference timing indicated by the reference timing data.

* * * * *